United States Patent
Stokking

(10) Patent No.: US 12,108,097 B2
(45) Date of Patent: Oct. 1, 2024

(54) COMBINING VIDEO STREAMS IN COMPOSITE VIDEO STREAM WITH METADATA

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventor: Hans Maarten Stokking, Wateringen (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, The Hague (NL)

(*) Notice: Subject to any disclaimer, the term of this patent is extended or adjusted under 35 U.S.C. 154(b) by 0 days.

(21) Appl. No.: 17/639,856

(22) PCT Filed: Aug. 31, 2020

(86) PCT No.: PCT/EP2020/074191
§ 371 (c)(1),
(2) Date: Mar. 2, 2022

(87) PCT Pub. No.: WO2021/043706
PCT Pub. Date: Mar. 11, 2021

(65) Prior Publication Data
US 2022/0329883 A1  Oct. 13, 2022

(30) Foreign Application Priority Data
Sep. 3, 2019 (EP) .................................. 19195078

(51) Int. Cl.
H04N 21/236 (2011.01)
H04N 21/234 (2011.01)
(Continued)

(52) U.S. Cl.
CPC ..... *H04N 21/2365* (2013.01); *H04N 21/2343* (2013.01); *H04N 21/2353* (2013.01); *H04N 21/845* (2013.01)

(58) Field of Classification Search
CPC ........... H04N 21/2365; H04N 21/2343; H04N 21/2353; H04N 21/845
(Continued)

(56) References Cited

U.S. PATENT DOCUMENTS 7,519,229 B2 * 4/2009 Wallace ............... H04N 9/8047
  375/240.18
9,621,853 B1  4/2017 Yang et al.
(Continued)

FOREIGN PATENT DOCUMENTS

CN  103517126 A  1/2014
CN  104641651 A  5/2015
(Continued)

OTHER PUBLICATIONS

U.S. Appl. No. 10/237,581, filed Mar. 19, 2019, Henaire, et al.
(Continued)

*Primary Examiner* — Dominic D Saltarelli
(74) *Attorney, Agent, or Firm* — Hamilton, Brook, Smith & Reynolds, P.C.

(57) ABSTRACT

A combiner system may be provided for combining, in a compressed domain, video streams of different media sources in a composite video stream by including a respective video stream as independently decodable spatial segment(s) in the composite video stream. The combiner system may generate composition metadata describing a composition of the spatial segments in the composite video stream and identification metadata comprising identifiers of the respective video streams. A receiver system may obtain decoded video data of a respective video stream based on the
(Continued)

composition metadata and a decoding of the composite video stream, and based on the identification metadata, identify a process for handling the decoded video data. Thereby, the composition of spatial segments may dynamically change, while still allowing the receiver device to correctly handle the spatial segments.

14 Claims, 12 Drawing Sheets

(51) Int. Cl.
   *H04N 21/2343* (2011.01)
   *H04N 21/235* (2011.01)
   *H04N 21/2365* (2011.01)
   *H04N 21/845* (2011.01)

(58) Field of Classification Search
   USPC .................................................. 375/240.01
   See application file for complete search history.

(56) References Cited

U.S. PATENT DOCUMENTS

| | | | |
|---|---|---|---|
| 10,397,666 | B2 | 8/2019 | Thomas et al. |
| 10,674,185 | B2 | 6/2020 | Thomas et al. |
| 10,694,192 | B2 | 6/2020 | Thomas et al. |
| 10,715,843 | B2 | 7/2020 | Van Brandenburg et al. |
| 10,721,530 | B2 | 7/2020 | Van Brandenburg et al. |
| 11,153,580 | B2 | 10/2021 | Bangma et al. |
| 2005/0008240 | A1 | 1/2005 | Banerji et al. |
| 2009/0143007 | A1 | 6/2009 | Terlizzi |
| 2009/0179904 | A1 | 7/2009 | Racicot |
| 2009/0235283 | A1 | 9/2009 | Kim et al. |
| 2010/0158109 | A1* | 6/2010 | Dahlby ............... H04N 21/8543 375/240.03 |
| 2010/0312905 | A1 | 12/2010 | Sandmann et al. |
| 2012/0075469 | A1 | 3/2012 | Oskin et al. |
| 2014/0010289 | A1 | 1/2014 | Lukasik et al. |
| 2016/0080692 | A1 | 3/2016 | Hsu |
| 2018/0197012 | A1 | 7/2018 | Wengrovitz et al. |
| 2018/0242028 | A1 | 8/2018 | Van Brandenburg et al. |
| 2018/0270287 | A1* | 9/2018 | Ouedraogo .......... H04N 19/103 |
| 2018/0338017 | A1 | 11/2018 | Mekuria et al. |
| 2019/0124397 | A1* | 4/2019 | Takahashi ............... H04H 20/28 |
| 2021/0409798 | A1* | 12/2021 | Maze ............. H04N 21/234363 |
| 2022/0279254 | A1 | 9/2022 | Stokking et al. |
| 2022/0345762 | A1* | 10/2022 | Frishman ........... H04N 21/4436 |

FOREIGN PATENT DOCUMENTS

| | | |
|---|---|---|
| CN | 106796794 A | 5/2017 |
| CN | 108476327 A | 8/2018 |
| CN | 109565611 A | 4/2019 |
| CN | 109691113 A | 4/2019 |
| DE | 102017110431 A1 | 11/2018 |
| EP | 1487214 A1 | 12/2004 |
| EP | 2 081 384 A2 | 7/2009 |
| JP | 2005-020463 A | 1/2005 |
| WO | WO 2021009155 | 1/2021 |

OTHER PUBLICATIONS

EP Search Report for EP Application No. 19195078.1, entitled: Combining Video Streams in Composite Video Stream With Metadata, date of report, dated Jan. 24, 2020.

International Search Report for PCT/EP2020/074191, entitled: Combining Video Streams in Composite Video Stream With Metadata, date of report, dated Oct. 30, 2020.

Feldman, C., et al., "Efficient Stream-Reassembling for Video Conferencing Applications using Tiles in HEVC," In Proc. of International Conferences on Advances in Multimedia (MMEDIA) 130-135 (2013).

Misra, K. et al., "An Overview of Tiles in HEVC," IEEE, Journal of Selected Topics in Signal Processing, 7(6): 969-977 (2013).

Niamut, K. et al., "MPEG DASH SRD—Spatial Relationship Description," (2016).

Sanchez, Y. et al., "Low Complexity Cloud-video-Mixing Using HEVC," The 11th Annual IEEE CCNC—Multimedia Networking, Services and Applications, (2014).

Alvarez, F., et al., "An Edge-to-Cloud Virtualized Multimedia Service Platform for 5G Networks," IEEE Transactions on Broadcasting, pp. 1-12 (2019).

Bachhuber, C., et al., "Are Today's Video Communication Solutions Ready for the Tactile Internet?," [retrieved on Dec. 12, 2018 at: https://www.researchgate.net/publication/316722252].

Burgos-Artizzu, X. P., et al., "Real-Time Expression-Sensitive HMD Face Reconstruction," Computer Science SIGGRAPH Asia 2015 Technical Briefs, pp. 1-4 (2015).

Feldmann, C., et al., "Efficient Stream-Reassembling for Video Conferencing Applications using Tiles in HEVC," Proc. of International Conferences on Advances in Multimedia (MMEDIA) pp. 130-135 (2013).

Hart, C. "Optimizing video quality using Simulcast (Oscar Divorra)" webrtcH4cKS pp. 1/8, [retrieved on Sep. 5, 2019 at https://webrtchacks.com/sfu-simulcast/].

Kondo, T., et al: "Development and Evaluation of the MEC Platform Supporting the Edge Instance Mobility", 2017 IEEE 41st Annual Computer Software and Applications Conference (Compsac), vol. 2, pp. 193-198 (2018).

Misra, K., et al. "An Overview of Tiles in HEVC", IEEE Journal of Selected Topics in Signal Processing, vol. 7, No. 6, pp. 969-977 (2013).

MPEG, ISO/IEC JTC1/SC29/WG11 MPEG2018/N17502, Use cases and requirements for NBMP (v4), Apr. 2018.

Prins, M. J., et al., "Togethervr: A Framework for Photo-Realistic Shared Media Experiences in 360-Degree Vr," TNO, The Netherlands (2017).

Park, K., and Mekuria, R., "Use cases and requirements for NBMP (v4)", ISO/IEC JTC1/SC29/WG11 MPEG2018/N17502, Apr. 2018.

Sanchez, Y. et al., "Low Complexity Cloud-Video-Mixing Using HEVC", IEEE 11th Consumer Communications and Networking Conference, pp. 415-420 (2014).

Zhang, L., et al., "On Energy-Efficient Offloading in Mobile Cloud for Real-Time Video Applications", IEEE Transactions on Circuits and Systems for Video Technology, Institute of Electrical and Electronics Engineers, vol. 27, No. 1, pp. 170-181 (2017).

EP 2 081 384 A3: Annex to the European Search Report for European Patent Application No. EP 08 25 1570, entitled: Video Tiling Using Multiple Digital Signal Processors, date of report: dated May 16, 2012.

C. Concolato et al., "Adaptive Streaming of HEVC Tiled Videos Using MPEG-DASH," in IEEE Transactions on Circuits and Systems for Video Technology, vol. 28, No. 8, pp. 1981-1992, Aug. 2018, doi: 10.1109/TCSVT.2017.2688491. (Year: 2018).

Feng Yuan, "Research on the Guaranteed Speed of Mobile Phone Videos with Different Definitions," Telecommunications Technology, issue 3, p. 48-51, Mar. 2017.

Baldoni et al., An Open-source Virtual Set-top-box for Softwarized Networks, Jul. 1, 2017, IEEE, 1-6 (Year: 2017).

* cited by examiner

COMBINING VIDEO STREAMS IN COMPOSITE VIDEO STREAM WITH METADATA

This application is the U.S. National Stage of International Application No. PCT/EP2020/074191, filed Aug. 31, 2020, which designates the U.S., published in English, and claims priority under 35 U.S.C. § 119 or 365(c) to European Application No. 19195078.1, filed Sep. 3, 2019. The entire teachings of the above applications are incorporated herein by reference.

FIELD OF THE INVENTION

The invention relates to a combiner system and computer-implemented method for combining video streams into a composite video stream. The invention further relates to a receiver device and computer-implemented method for receiving and decoding video streams. The invention further relates to a computer-readable medium comprising computer-readable instructions for causing a processor system to carry out a computer-implemented method. The invention further relates to a computer-readable medium comprising metadata for use by the receiver device.

BACKGROUND ART

Media content such as video content and audio content is commonly delivered to users in digital form. If media content has a temporal aspect, and in particular is associated with a timeline which indicates how the media content is to be played-out over time, such digital form is typically referred to as a media stream.

In many applications, there may be a number of client devices which each transmit video via a telecommunication network to another client device, which in turn may receive the respective videos via the telecommunication network. For example, in video-based multiuser communication, a client device may function both as a transmitter device by transmitting a live video recording of a user as a video stream to other client devices, and as a receiver device by receiving the video streams of the other client devices. The received video streams may then be decoded and displayed by the client device, for example simultaneously in a video mosaic or as so-called video avatars in a computer-graphics based environment. Also, it is common to deliver other videos as part of such multi-user communication, e.g., when users watch a movie together, or when one user shares a video with the other users. Another example is a security application, in which a plurality of security cameras each transmit a respective video via a telecommunication network to a receiver device which receives, decodes and displays the videos on a display, for example simultaneously in a video mosaic.

A problem in video streaming in which a receiver device receives the video streams of a plurality of transmitter devices is that it may be challenging for the receiver device to receive and decode multiple video streams simultaneously. For example, lower-end receiver devices such as lower-end smartphones may only have one hardware decoder allowing only one video stream to be hardware decoded. The other streams may be software decoded which is typically computationally (much) more intensive. This problem may be aggravated in cases where there are more than two video streams, e.g., one for each of the other participants in a conference call.

This problem may be addressed by combining multiple video streams into a composite video stream, and in particular using a so-called tile-based video encoding technique [1] in which the individual video streams are included in the composite video stream as one or more independently decodable video streams. A video stream may thus be represented in the composite video stream as one or a set of tiles. Such 'tiles' may here and elsewhere also be referred to as 'spatial segments', the composite video stream may here and elsewhere also be referred to as a 'combined video stream', and the tile(s) in the composite video stream which represent a video stream may be referred to as a 'substream' of the composite video stream. If instead such a single composite video stream is transmitted to a receiver device, the video decoding by the receiver device may be greatly facilitated, as the single composite video stream may be decodable by a single hardware or software decoder instance.

For example, [2] describes a Multipoint Control Unit (MCU) which may disassemble and reassemble the video streams in a video conferencing application so as to create a custom video stream for each client that only includes people that will be rendered by that client in order to use the available bandwidth to full capacity. It is described how in High Efficiency Video Coding (HEVC) the encoder can be modified to enable a reassembling operation that is HEVC compliant and works on a high syntax level in the bitstream. Hereby, no entropy encoding or decoding may be needed for combining the video streams.

Disadvantageously, [2] provides a composite video stream to the receiver device in which the composition of video streams is fixed and in which the receiver device does not have any knowledge on the individual video streams other than they represent a video stream. For example, it is not known which video stream represents which particular participant. Therefore, [2] may not be suitable to deliver a composite video stream to the receiver device in which the composition of video streams dynamically changes. Such dynamic changing of the composition may be desired.

For example, one may consider using a composite video stream to deliver different types of video to the receiver device, which may one moment in time comprise a YouTube and a video of a videoconferencing participant, and at another moment in time the videos of two videoconferencing participants, and at yet another moment in time the video of another videoconferencing participant and a so-called 'self-view' of the user of the receiver device. It may be desirable to adjust the rendering of the respective videos accordingly. For example, a YouTube video may be played out full-screen or in a large-format, while a self-view may be displayed in a small overlay window. Another example is that in a multitasking environment, the YouTube video may be played out by a YouTube application while a video of a videoconferencing participant may be played out by a separate videoconferencing application.

REFERENCES

[1] K. Misra et al. (2013). An Overview of Tiles in HEVC. In IEEE Journal of Selected Topics in Signal Processing, vol. 7, no. 6, pp. 969-977.

[2] Feldmann, C., Bulla, C., & Cellarius, B. (2013, April). Efficient stream-reassembling for video conferencing applications using tiles in HEVC. In Proc. of International Conferences on Advances in Multimedia (MMEDIA), pp. 130-135.

SUMMARY OF THE INVENTION

While it may be statically defined, for example between the MCU and the receiver device or an application running on the receiver device, which specific video stream, e.g. of which particular participant, is included in which specific part of the composite video stream, e.g., at the left hand side or the right hand side, this provides insufficient flexibility when dynamically generating a composite video stream.

It would be advantageous to enable different substreams of a composite video stream to be processed in different ways, for example by processes of different applications, while accounting for that the composition of substreams may dynamically change, for example by one or more substreams changing in resolution and/or shape, substreams being added and/or being removed from the composite video stream.

In accordance with a first aspect of the invention, a combiner system may be provided for combining a plurality of video streams into a composite video stream. The combiner system may comprise:

a network interface subsystem for receiving at least a first video stream comprising a first video of a first media source and a second video stream comprising a second video of a second media source;

a processor subsystem which may be configured to:
  in a compressed domain, combining the first video stream and the second video stream to obtain a composite video stream, wherein the composite video stream is a spatially segmented composite video stream, and wherein said combining comprises including each respective video stream as one or more independently decodable spatial segments in the spatially segmented composite video stream;
  generating composition metadata describing a composition of the spatial segments in the composite video stream;
  generating identification metadata comprising a first identifier of the first video stream and a second identifier of the second video stream, wherein the first identifier and the second identifier uniquely identify the respective video streams in the composite video stream;
  via the network interface subsystem, streaming the composite video stream to a receiver device and providing the composition metadata and the identification metadata to the receiver device.

In accordance with a further aspect of the invention, a computer-implemented method may be provided for combining a plurality of video streams into a composite video stream. The method may comprise:

receiving at least a first video stream comprising a first video of a first media source and a second video stream comprising a second video of a second media source;

in a compressed domain, combining the first video stream and the second video stream to obtain a composite video stream, wherein the composite video stream is a spatially segmented composite video stream, and wherein said combining comprises including each respective video stream as one or more independently decodable spatial segments in the spatially segmented composite video stream;

generating composition metadata describing a composition of the spatial segments in the composite video stream;

generating identification metadata comprising a first identifier of the first video stream and a second identifier of the second video stream, wherein the first identifier and the second identifier uniquely identify the respective video streams in the composite video stream;

streaming the composite video stream to a receiver device and providing the composition metadata and the identification metadata to the receiver device.

In accordance with a further aspect of the invention, a receiver device may be provided for receiving and processing a first video of a first media source and a second video of a second media source. The receiver device may comprise:

a network interface for receiving:
  a composite video stream, wherein the composite video stream is a spatially segmented composite video stream which includes at least a first video stream and a second video stream, wherein each video stream is included in the composite video stream as one or more independently decodable spatial segments, wherein the first video stream comprises the first video of the first media source and the second video stream comprises the second video of the second media source;
  composition metadata describing a composition of the spatial segments in the composite video stream; and
  identification metadata comprising a first identifier of the first video stream and a second identifier of the second video stream, wherein the first identifier and the second identifier uniquely identify the respective video streams in the composite video stream;

a processor subsystem which may be configured to, for at least one of the spatial segments of the composite video stream:
  obtaining decoded video data of a respective video stream based on the composition metadata and a decoding of the composite video stream;
  identify a process for handling the decoded video data based on a respective identifier of the respective video stream;
  provide the decoded video data of the respective video stream to the process.

In accordance with a further aspect of the invention, a computer-implemented method may be provided for receiving and processing a first video of a first media source and a second video of a second media source. The method may comprise:

receiving a composite video stream, wherein the composite video stream is a spatially segmented composite video stream which includes at least a first video stream and a second video stream, wherein each video stream is included in the composite video stream as one or more independently decodable spatial segments, wherein the first video stream comprises the first video of the first media source and the second video stream comprises the second video of the second media source;

receiving composition metadata describing a composition of the spatial segments in the composite video stream;

receiving identification metadata comprising a first identifier of the first video stream and a second identifier of the second video stream, wherein the first identifier and the second identifier uniquely identify the respective video streams in the composite video stream;

for at least one of the spatial segments of the composite video stream:
  obtaining decoded video data of a respective video stream based on the composition metadata and a decoding of the composite video stream;

identifying a process for handling the decoded video data based on a respective identifier of the respective video stream;

providing the decoded video data of the respective video stream to the process.

The above measures may be used in the context of a receiver device seeking to receive at least a first video of a first media source and a second video of a second video source. The following refers to an example in which such videos may be obtained from two or more transmitter devices transmitting the respective videos and the receiver device receiving the respective videos via a telecommunication network, such as a 5G or later generation telecommunication network or the Internet. Each device may be connected to the telecommunication network via an access network, such as in the case of 5G a radio access network or in the case of the Internet a DSL or fiberoptic-based access network. The telecommunication network may in some cases also be considered a 'core network' to which client devices are connected via respective access networks. In general, however, such videos may also be obtained from other types of media sources, including a single media source, while the media sources may include media servers, media transcoders, stream caches, stream buffers, etc., or in general, may be one or more nodes of a content delivery network.

Instead of streaming the respective videos directly to the receiver device, the video streams may be streamed to a combiner system, which may in some examples be an edge node of the telecommunication network. For example, such an edge node may be embodied by an edge node or a system of edge nodes of a 5G or later generation telecommunication network, or any other type of edge computing system, e.g., located at an edge between the telecommunication network and an access network. Such edge nodes are known per se, as is the identification of suitable edge nodes for a particular client device which is connected to a telecommunication network via a particular access network. In other examples, the combiner system may be another type of network node located in a non-edge part of the telecommunication network or may be part of the receiver device.

In some examples, the transmitter device may obtain the video by video capture, e.g., using a built-in or connected camera. For example, the transmitter device may be a security camera, or a smartphone having a built-in camera, or a PC with a connected webcam. Alternatively, the transmitter device may not capture video but rather store or buffer the video, e.g., in a data storage, or transcode the video.

The combiner system may receive the video streams directly from the respective transmitter devices but also indirectly, e.g., via stream caches or stream buffers. Having received the video streams, the combiner system may combine the video streams into a composite video stream. Here, the term 'composite' may refer to video stream being included as part of a spatial composition in the resulting combined video stream. Specifically, the composite video stream may be a spatially segmented composite video stream. Such encoding as spatial segments is known per se, e.g., from [1] in which spatial segments are referred to as 'tiles'. Such tiles may subdivide a video frame into logically separate and usually rectangular parts that may be decoded independently when decoding a given frame, but which spatial segments may also be decoded together as a whole. The encoding of tiles may not allow spatial prediction across tile boundaries in a frame or may not allow entropy coding dependencies across tile boundaries. As such, tiles may be independent with respect to the encoding and decoding process, in that prediction and filtering may not cross tile boundaries. The following refers to 'tiles' and 'spatial segments' interchangeably.

The combining of the first video stream and the second video stream may involve, if the first video stream or the second video stream are not already received as tiles, (re)encoding a respective video stream as one or more tiles together representing a tile-based video stream. However, if a respective video stream is already received as a tile-based video stream, such (re)encoding may not be necessary. It is noted that if decoding and encoding has to be performed, the combining may alternatively take place in the uncompressed domain, e.g., after decoding and before encoding. The tiles themselves may then be combined in the compressed domain, e.g., without having to decode, generate a spatial composition, and re-encode the video data of the spatial composition. Such combining in the compressed domain is known per se, for example from [3] (see 'further references' at the end of the section) and may comprise generating a new bitstream which includes the bitstream data of all tiles and corresponding header information, while re-writing the appropriate parts, e.g., rewriting Video Parameter Sets, Sequence Parameter Sets, Picture Parameter Sets, slice segments headers, etc. For example, as also described in Section III.B of Sanchez et al., in-loop filtering may be disabled, parameter set values may be consistent across input videos, preferably no conformance cropping windows are present, sub-sample vector selection for prediction units should preferably be constrained close to the edge of the input, etc. After combining, both video streams may be included in the composite video streams as tiles being placed side-by-side or top-to-bottom or in another spatial arrangement. In case there are more video streams to be combined, various other spatial compositions of the video streams may be made, for example as 2D array of N×M video streams, e.g., 3×2 for 6 video streams. It is noted that a respective video stream may also comprise multiple tiles and also be included as multiple tiles in the composite video stream. Such a composite video stream may then be decodable by a single decoder instance.

In addition, composition metadata may be generated which may describe the spatial composition of the spatial segments in the composite video stream. Such composition metadata may be known per se, and may for example take the form of the so-called spatial relationship description (SRD), e.g., as described in [4]. Effectively, the composition metadata may describe the spatial relation between the tiles, e.g., whether they are composited side-by-side or in a 2D array or matrix, and may enable a decoder to decode select spatial segments from the composite video stream. It may also enable a decoder to split the decoded composite video in spatial segments after decoding.

In addition, identification metadata may be generated. Unlike the composition metadata, which may merely describe the composition of the spatial segments, the identification metadata may contain identifiers of the respective video streams, which identifiers may uniquely identify the respective video stream in the composite video stream. In other words, the identification metadata may enable a receiver device to distinguish between the video streams in the composite video stream by being able to dynamically determine the identity of a substream of the composite video stream. While the composition metadata may simply refer to several video streams, e.g., by a generic numerical identifier such as '1', '2', '3', '4', etc. but which otherwise may leave the video streams indistinguishable from each other, the identifiers of the video streams may allow the receiver device to uniquely distinguish the video streams from each other. Accordingly, the receiver device may determine, on the basis of the identification metadata, that at one moment in time, a video stream with the identifier 'A' is located at position (1,1) in a 2×2 array of substreams, and at another moment in time, for example in a following streaming session, the video stream with the identifier 'A' is located at another position (2,1) in the 2×2 array of substreams.

The composition metadata and the identification metadata may be provided to the receiver device, for example at a start of a streaming session with the receiver device or on a periodical basis, for example in response to changes in the video streams. The receiver device may then decode a respective spatial segment, which may typically involve decoding all of the composite video stream to obtain a decoded video frame containing the video data of all spatial segments and splitting the decoded video frame based on the composition metadata into smaller individual video frames of the respective spatial segments. The term 'obtaining decoded video data of a respective video stream based on the composition metadata and a decoding of the composite video stream' may thus comprise decoding the composite video stream and splitting or separating the decoded video data based on the composition metadata. It is noted that the decoding may not always need to involve decoding all of the composite video stream as originally received, but in some cases may comprise decoding only one or a subset of the spatial segments of the originally received composite video stream based on the composition metadata. For example, before decoding, the composite video stream may be modified based on the composition metadata by removing substreams from the composite video stream to obtain a modified composite video stream which may only contain the one or the subset of the spatial segments, which modified composite video stream may then be decoded by the receiver device.

Having obtained the decoded video data, the decoded video data may be passed on to a process running on the receiver device which may further handle the decoded video data, for example by processing and/or rendering the decoded video data. This process may be identified based on the identifier of the respective video stream which may be obtained from the identification metadata.

The above measures may have the effect that the receiver device is provided with knowledge on the individual video streams by way of the identifiers uniquely identifying a respective video stream in the composite video stream. Such identifiers may be used to for example indicate which video stream represents which particular participant of a telecommunication session. Compared to a static definition of the identity of video streams within the composite video stream, the dynamic providing of identification metadata may provide more flexibility. In particular, the composite video stream may be dynamically generated to contain specific video streams requested by the receiver device, without it having to be statically defined between the combiner system and the receiver device which of the video streams are placed where in the composite video stream. On the basis of the identification metadata, the receiver device may be able to identify each of the video streams and process them accordingly. For example, if a composite video stream contains a YouTube video and a video of a participant of a videoconferencing application, the receiver device may pass the decoded video of the YouTube video to a process of a YouTube application while the decoded video of the participant may be passed to a process of a videoconferencing application. This setup may allow for decoding the composite video as one video, which decoding may use specialized hardware for decoding such as a hardware decoder or a GPU, while delivering the various video streams to their respective applications or processes.

It may therefore not be needed to statically define the identity of video streams within the composite video stream. This may allow the use of composite video streams for delivering multiple video streams to a receiver device outside a single administrative domain, which would otherwise be required to enable such static definition.

In an embodiment, the processor subsystem may be configured to link the identification metadata to the composition metadata so as to link the first identifier and the second identifier to the respective spatial segments in the composite video stream. The identifiers may be explicitly linked to the composition metadata, for example by being contained in a same data structure in which the composition is defined, for example by defining an M×N array of substreams in which each entry of the array contains a respective identifier. While such explicit linking may not be needed, for example if the relation between identifiers and the composition is statically defined, such linking may provide additional flexibility as such static definition may not be needed.

In an embodiment, the processor subsystem may be configured to include the identification metadata in the composition metadata and/or in the composite video stream. By including the identification metadata in the composition metadata and/or in the composite video stream, it may not be needed to provide an additional mechanism which associates the identification metadata with the respective metadata or stream.

In an embodiment, the processor subsystem may be configured to include the composition metadata and/or the identification metadata as or in at least one of:
 as attributes exchanged in signaling during session management;
 as metadata exchanged with the receiver device via a data channel;
 in a metadata stream; and/or
 in a header of the composite video stream.

The above may be advantageous ways of providing the composition metadata and/or the identification metadata to the receiver device.

In an embodiment, the first identifier and/or the second identifier may comprise at least one of:
 an identifier of a source of a respective video stream;
 an identifier of a destination of a respective video stream;
 an identifier of a content of a respective video stream; and
 an identifier of an application which has generated or which is intended to handle the respective video stream.

Each of the above identifiers may be indicative of an identity of a respective video stream and may allow the receiver device to select a process for handling the decoded video data of the respective video stream. Here, the source and destination may be a network source and network destination but may also more broadly identify a source or destination of the video stream, for example by referring to an event at which a video stream was recorded, or to an application for which the video stream is intended. For example, it may be identified that a respective video stream is obtained from a particular content delivery network, e.g., from 'Netflix' or YouTube', or that a video stream should be passed to 'the default video player' on a receiver device.

In an embodiment, the processor subsystem may be configured to, via the network interface subsystem, receive at least one of the first identifier and the second identifier from at least one of:
- a transmitter device which is streaming the respective video stream to the combiner system; and
- the receiver device as part of a stream request of the receiver device.

The identifier of a particular video stream may be received from the transmitter device, for example in the form of identification metadata identifying this video stream, but also from the receiver device. Namely, the stream request may be indicative of such an identifier in that it may contain an URL or other type of resource locator of the video stream, which in itself may represent a source identifier of the video stream. By including the identifier in the identification metadata of the composite video stream, the receiver device may be able to associate the requested video stream with one of the delivered substreams of the composite video stream and thereby process the substream accordingly, for example using a particular process.

In an embodiment, the processor subsystem may be configured to, via the network interface subsystem, request at least one of the first video stream and the second video stream from a transmitter device based on a stream request of the receiver device for the respective video stream. The combiner system may itself request a respective video stream from a transmitter device on behalf of the receiver device, namely by issuing such a request based on the stream request of the receiver device. This way, the combiner system may be provided with an identifier of the video stream, either from the stream request of the receiver device or from the transmitted video stream of the transmitter device or from a combination of both. It may therefore not be needed for the combiner system to separately request such an identifier.

In an embodiment, the stream request may be received from at least one of:
- a session management system which receives the stream request from the receiver device and forwards the stream request to the combiner system; and
- the receiver device.

In an embodiment, the combiner system may be embodied by an edge node or a system of edge nodes of a telecommunication network.

In an embodiment, the process is at least one of: a process or a subprocess of an application, wherein the application is running on or is executable by the receiver device. The processes, which may be selected for the handling the decoded video data of the different video streams, may be of different applications or of a same application.

In accordance with a further aspect of the invention, a computer-readable medium may be provided comprising transitory or non-transitory data which may represent a computer program, the computer program comprising instructions for causing a processor system to perform one of the computer-implemented methods.

In accordance with a further aspect of the invention, a computer-readable medium may be provided. The computer readable medium may comprise transitory or non-transitory data which may represent identification metadata for a composite video stream, wherein the composite video stream may be a spatially segmented composite video stream which includes at least a first video stream and a second video stream, wherein each video stream is included in the composite video stream as one or more independently decodable spatial segments, wherein the identification metadata may comprise a first identifier of the first video stream and a second identifier of the second video stream, wherein the first identifier and the second identifier may uniquely identify the respective video streams in the composite video stream.

It will be appreciated by those skilled in the art that two or more of the above-mentioned embodiments, implementations, and/or aspects of the invention may be combined in any way deemed useful.

Modifications and variations of any computer-implemented method, system, device, network node and/or computer-readable medium, which correspond to the modifications and variations described for another one of said entities, can be carried out by a person skilled in the art on the basis of the present description.

FURTHER REFERENCES

[3] Sanchez, Y. et al. Low complexity cloud-video-mixing using HEVC. In IEEE 11th Consumer Communications and Networking Conference, 2014.
[4] Niamut, O. A., Thomas, E., D'Acunto, L., Concolato, C., Denoual, F., & Lim, S. Y. (2016, May). MPEG DASH SRD: spatial relationship description. In Proceedings of the 7th International Conference on Multimedia Systems (p. 5).

BRIEF DESCRIPTION OF THE DRAWINGS

These and other aspects of the invention are apparent from and will be elucidated with reference to the embodiments described hereinafter. In the drawings.

Figure 1:
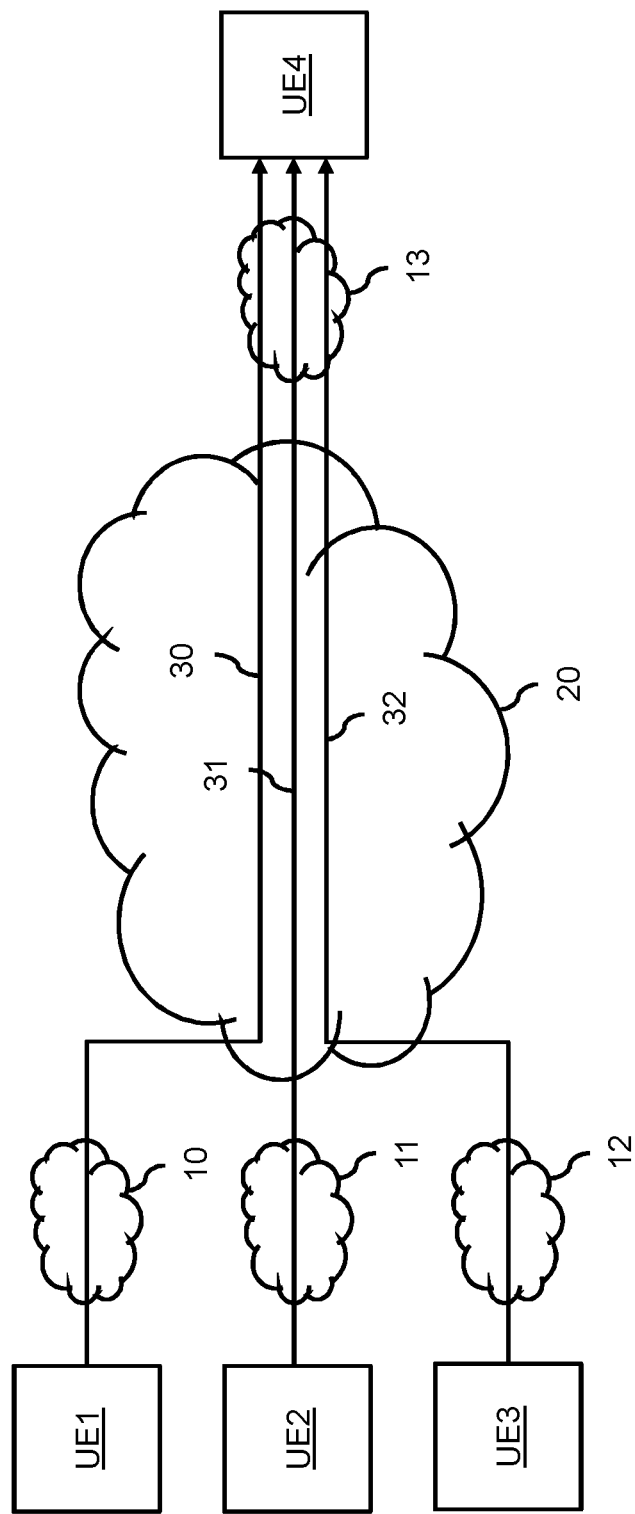
FIG. 1 shows a plurality of transmitter devices each transmitting a respective video via a telecommunication network and a receiver device receiving the respective videos via the telecommunication network, with said devices being connected to the telecommunication network via respective access networks.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

A, B video stream, independently decodable spatial segment
A', B' decoded video data
$ID_A$, $ID_B$ identifier for video stream A, B
ENX Edge Node X
MCU Multipoint Control Unit
UEX User Equipment X
YT YouTube
10-13 access network
20 telecommunication network
30-32 video stream
40-42 tiled video stream
50-51 combiner
60 composite video stream
100 capture
110 encode
120 decode
130 process
140 tile/encode
150 combine
160 decode
170 split/render
200, 201 video stream
210, 211 video stream with identification metadata
220 composite video stream
230 identification metadata
240 decoded video data of composite video stream
250, 251 decoded video data of individual video stream
3-1 request stream A
3-2 request stream A
3-3 request stream A
3-4 instructions
3-5 stream A
3-6 stream A
3-7 stream A
3-8 request stream B
3-9 request stream B
3-10 request stream B
3-11 instructions
3-12 stream B
3-13 stream A, B
3-14 stream B
300, 302 video stream source
310 network node, edge node
312 session manager
314 stream combiner
320 receiver device
322 stream manager
324 decoder
326 splitter
330 application 1
332 application 2
400 processor system configured as combiner
420 network interface
422 network communication data
440 processor subsystem
460 data storage
500 processor system configured as receiver device
520 network interface
522 network communication data
540 processor subsystem
560 display output
562 display data
580 display
600 method for combining video streams
610 receiving video streams
620 combining video streams in compressed domain as independently decodable spatial segments of composite video stream
630 generating composition metadata describing composition
640 generating identification metadata comprising identifiers uniquely identifying video streams in composite video stream
650 streaming the composite video stream to receiver device
660 providing composition metadata and identification metadata to receiver device
700 method for receiving and processing videos
710 receiving composite video stream comprising video streams as independently decodable spatial segments
720 receiving composition metadata describing composition
730 receiving identification metadata comprising identifiers uniquely identifying video streams in composite video stream
740 obtaining decoded video data of video stream based on composition metadata and decoding of composite video stream
750 identifying process for handling decoded video data based on identifier of video stream
760 providing decoded video data to identified process
800 computer-readable medium
810 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

Some of the following embodiments are described within the context of video conferencing, such as video conferencing in VR where a number of users participate in a teleconference using HMDs and cameras and in which the receiver device of each user receives the videos streams of the other users. However, the techniques described in the following embodiments may also be used in any other context in which a receiver device receives several video streams via the telecommunication network, which may for example be transmitted by respective transmitter device. A specific non-VR type of example is a security application in which video streams of multiple security cameras are received or live event registration in which multiple cameras are used to capture different viewpoints of an event.

It is further noted that in the following, any reference to a 'video stream' may refer to a data representation of a video which is suitable for being streamed, e.g., using known streaming techniques. Furthermore, a reference to a 'video' may include a video stream but also a data representation of the video which is not (yet) suitable for being streamed or at least conventionally not intended for streaming. In the Figures, video (streams) may be schematically represented by a single video frame.

Various embodiments are described with reference to FIGS. 6-15, while exemplary technical contexts in which the embodiments may be used are described with reference to FIGS. 1-5. While many combinations of embodiments and technical contexts are explicitly or at least implicitly described, other combinations of embodiments and technical contexts will be apparent to the skilled person.

FIG. 1 shows a plurality of transmitter devices UE1-UE3 each transmitting a respective video via a telecommunication network 20 in a streaming manner (which is elsewhere also simply referred to as 'streaming'). Such streaming is indicated in FIG. 1 by arrows 30-32, and may include any known streaming technique such as using RTP streaming, UDP streaming, DASH streaming, etc. FIG. 1 further shows a receiver device UE4 receiving the respective videos 30-32 via the telecommunication network 20. Each of the devices UE1-UE4 is shown to be connected to the telecommunication network 20 via a respective access network 10-13. In the example of FIG. 1, the telecommunication network 20 may be a 5G or later generation telecommunication network to which the devices, being here 'User Equipment' (UE), are connected via respective radio access networks 10-13. In other examples, the telecommunication network 20 may be the Internet, and the access networks 10-13 may be DSL or fiberoptic-based access networks. Various other examples of telecommunication networks and access networks exist as well.

Although not shown in FIG. 1, in some embodiments, each transmitter device may also be a receiver device and vice versa, in that each device may receive the videos of the other devices and transmit its own video to the other devices. This may for example be the case in video conferencing. In other embodiments, only some of the transmitter devices may also be receiver devices and/or vice versa. In other embodiments, transmitter devices may transmit video but do not receive video while receiver devices may receive video and do not transmit video. In other embodiments, several or all of the video streams may be transmitted by a same transmitter device. The receiver devices and/or transmitter devices may be end-user devices buy may also be servers and/or network entities in the network, e.g., network nodes.

A problem in video streaming in which a receiver device receives the video streams of a plurality of transmitter devices is that it may be challenging for the receiver device to receive and decode multiple video streams simultaneously. For example, lower-end receiver devices such as lower-end smartphones may only have one hardware decoder allowing only one video stream to be hardware decoded. The other streams may be software decoded which is typically computationally (much) more complex. This problem may be aggravated in cases where there are more than two video streams, e.g., one for each of the other participants in a conference call.

Figure 2:
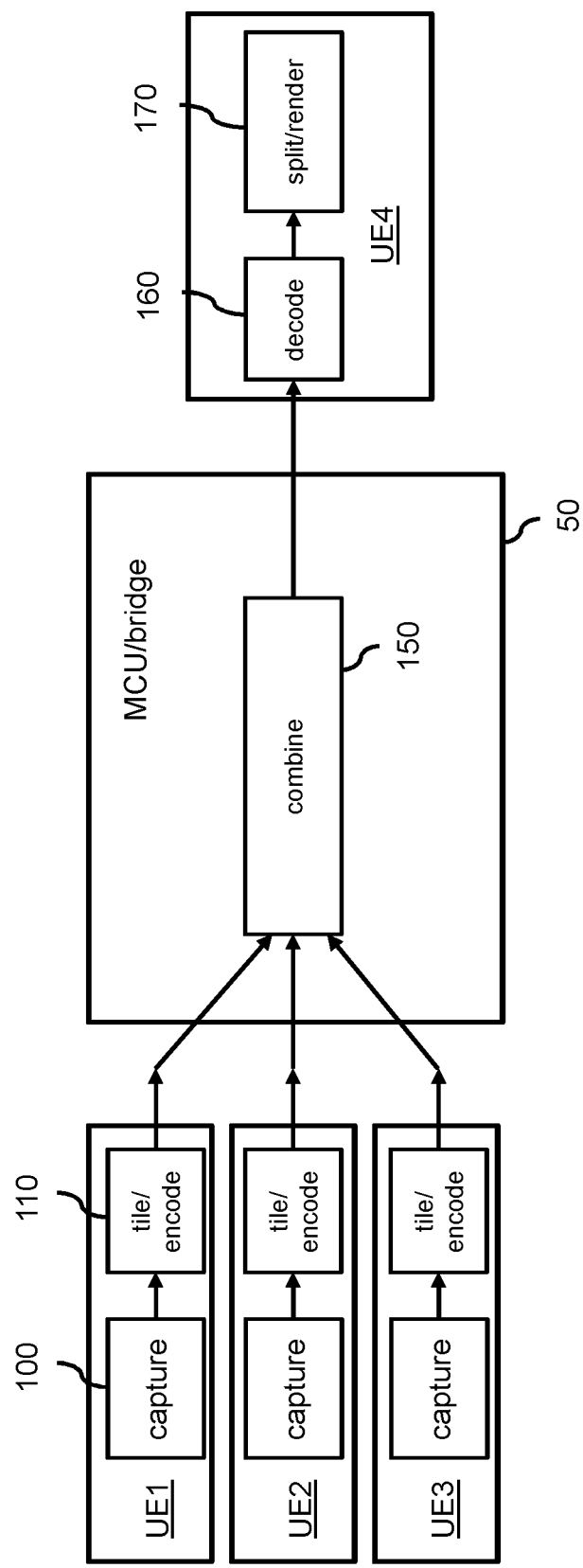
FIG. 2 shows a plurality of transmitter devices each capturing a video and in a tiled manner encoding the video to obtain respective tile-based video streams, and a combiner in the telecommunication network combining the tile-based video streams in the compressed domain to obtain a combined tile-based video stream, and a receiver device receiving and decoding the combined tile-based video stream.

FIG. 2 shows how such video streams may be combined by an entity which is here and elsewhere referred to as a 'combiner system' or simply as a 'combiner'. In particular, FIG. 2 shows a plurality of transmitter devices UE1-UE3 each capturing 100 a video and in a tiled manner encoding 110 the captured video to obtain respective tile-based video streams. Here, the term 'encoding in a tiled manner' may refer to encoding the video in such a way that it is suitable for use as a tile in a larger configuration of tiles. Such tile-based video encoding is known per se, e.g., from HEVC tiled streaming [1], and as indicated elsewhere, a tile may represent an independently decodable spatial segment. Such tiles may allow a combiner 50 in the telecommunication network or elsewhere to combine 150 the tile-based video streams in the compressed domain to obtain a combined tile-based video stream. The combined tile-based video stream may then be transmitted by the combiner 50 to a receiver device UE4 which may receive and decode 160 the combined tile-based video stream, after which the videos may be rendered 170. Such rendering is here and elsewhere also referred to as 'split/render', referring to the fact that the videos may be split into individual parts again, before being rendered by their respective renderers. The rendering itself is optional, as alternatively and for example, each individual stream may be stored or recorded.

The combiner 50 may for example be a cloud-based server, or in general may be any suitably configured network node or combination of physical nodes used together for this purpose, typically referred to as 'cloud'. Examples of such network nodes include, but are not limited to, Multipoint Control Units (MCUs) and video conferencing bridges and, in the case of VR-based teleconferencing, VR bridges, with the type of server depending on the technical and application-specific context.

By the combiner 50 providing a single combined tile-based video stream, the computational load on the receiver device UE4 may be reduced by having only to decode one combined tile-based video stream, instead of several (non-tiled) video streams. In addition, by performing the combining 150 in the compressed domain, the computational load on the combiner 50 may in some examples be reduced, for example if several or all of the video streams which are to be combined are received from the transmitter devices UE1-UE3 directly as tile-based video streams. Accordingly, there may not be a need for the combiner 50 decode and then in a tiled manner encode each received video stream. It will be appreciated, however, that in some examples, the combiner 50 itself may perform the tile-based encoding before then combining the resulting tile-based video streams in the compressed domain.

Figure 3:
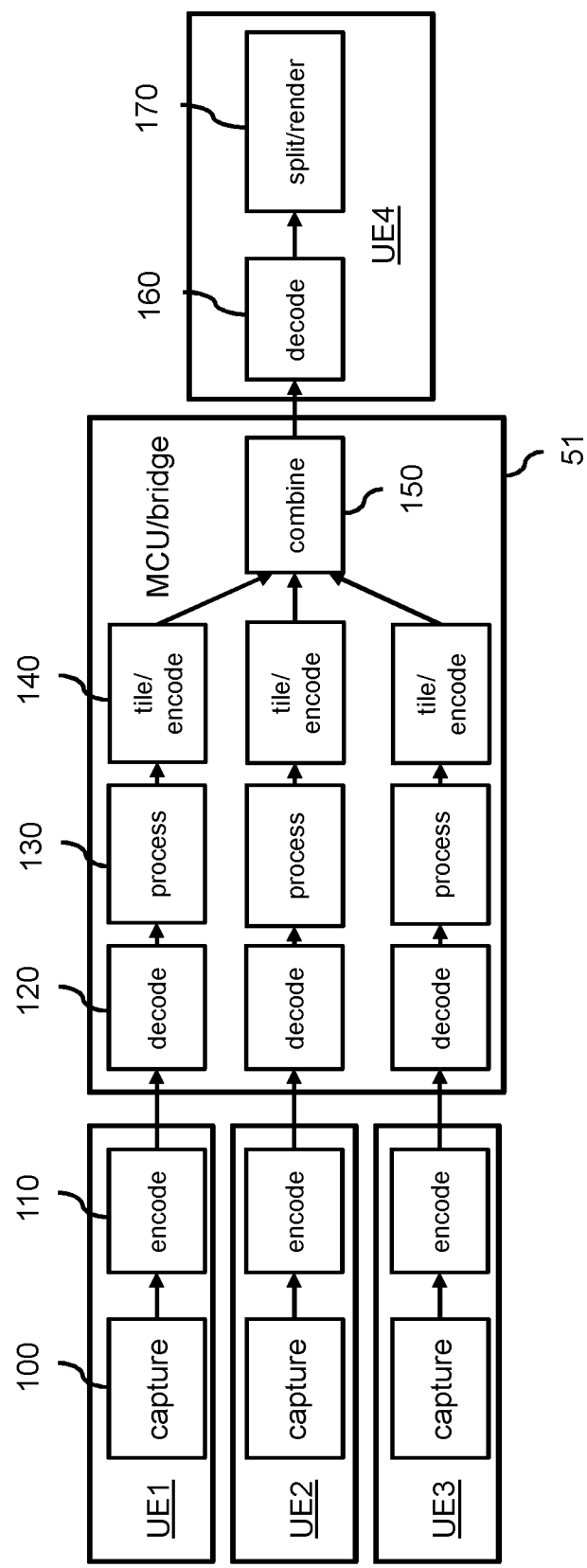
FIG. 3 shows the combiner processing the received video streams, necessitating the video streams to be decoded and after processing re-encoded.

FIG. 3 shows an example of the above. Namely, in this example, the videos may need to be processed before being rendered by a receiver device. Such processing may be computationally intensive and may for example involve so-called head mounted display (HMD) removal, foreground/background segmentation, object detection, object annotation, object insertion, object transformation, object replacement, 3D reconstruction, etc., and may in general be a computer vision-based processing. While it may be possible to perform such processing on a respective transmitter device or on the receiver device, the computational load caused by such processing may be too large for an individual device. This holds especially in case of the receiver device, as it may have to process several of such video simultaneously.

However, such processing may be 'offloaded' to another entity, for example a cloud-based server, and in particular to the combiner. The latter is shown in FIG. 3, where the combiner 51 is shown to process 130 each video and combine 150 the processed videos. However, as the combiner 51 is typically located at a distance from the devices UE1-UE4, e.g., when implemented by a cloud-based server, the bandwidth to and from the devices UE1-UE4 may be limited, which may require spatiotemporal compression to be applied, e.g., with forward and backward temporal dependencies. As a result, each transmitter device UE1-UE3 may have to encode 110 the video before transmission to the combiner 51, the combiner 51 may have to decode 120 each received video, process 130 each decoded video, encode each processed video 140 in a tile-based manner, and then combine 150 the resulting tiles in the compressed domain to obtain a combined tile-based video stream which may be streamed to the receiver device UE4, which may then, as in the case of FIG. 2, decode 160 the combined tile-based video stream and then render 170 the decoded videos. It will be appreciated that the encoding 110 by the transmitter devices UE1-UE3 may be a tile-based encoding, in which case the decoding 120 by the combiner 51 may be a tile-based decoding. However, in some examples, the encoding 110 may be a non-tile-based encoding, for example using a non-tile-based video coding codec.

Figure 4:
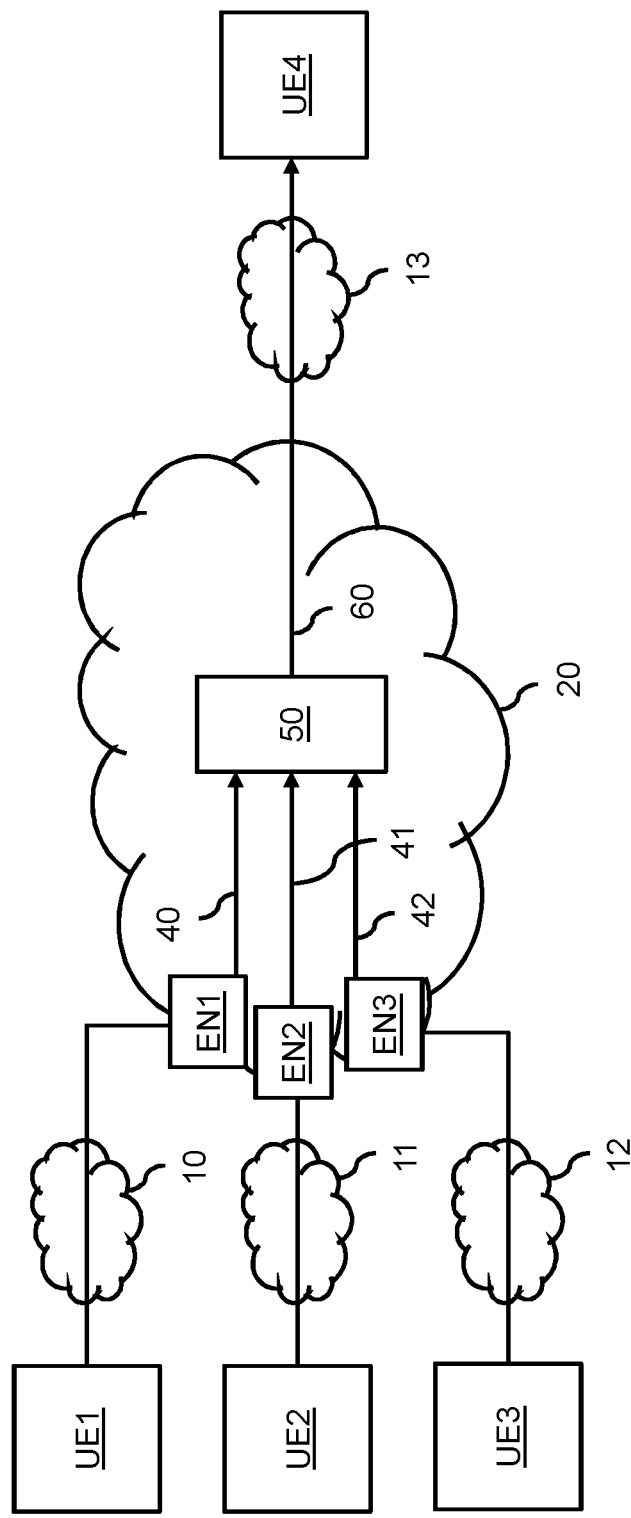
FIG. 4 shows a plurality of transmitter devices each transmitting a captured video to a respective edge node of the telecommunication network which processes and encodes the video using a tiled video streaming codec to obtain a tile-based video stream, and a combiner combining the tile-based video streams to obtain a composite video stream which is transmitted to a receiver device.
Figure 5:
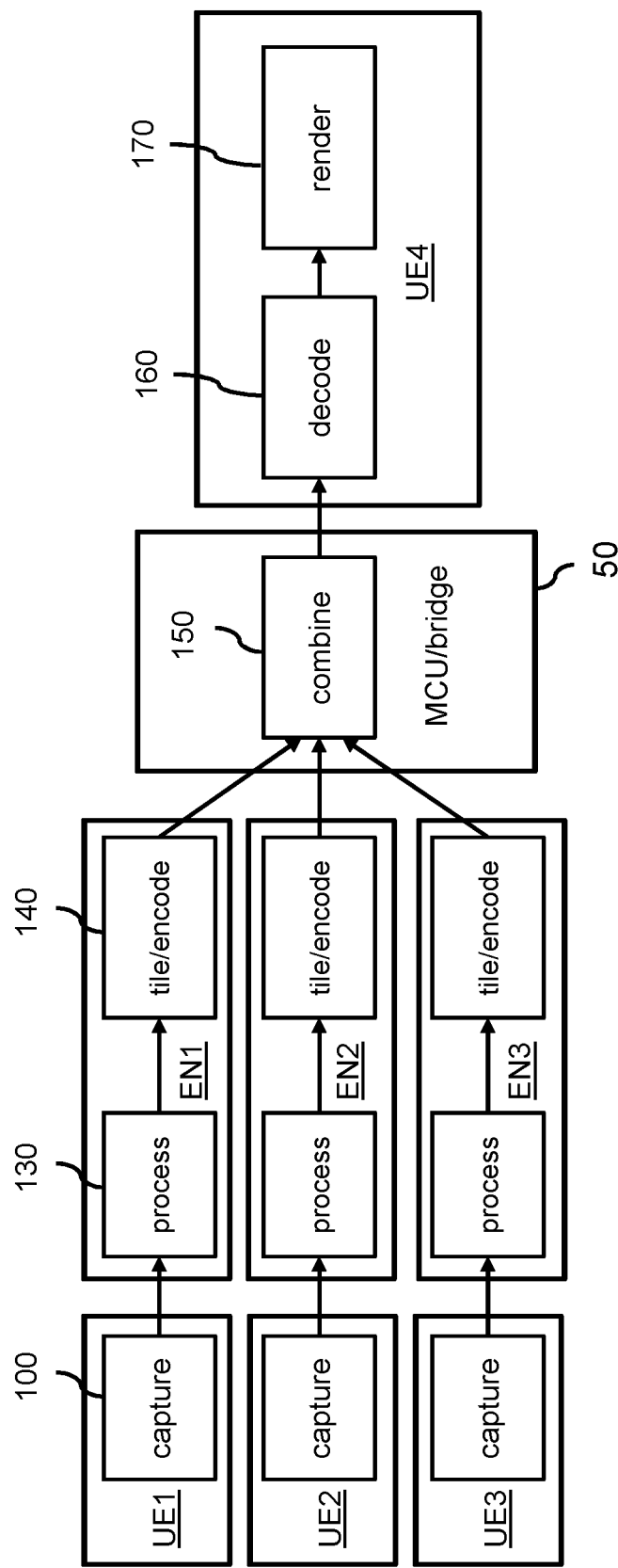
FIG. 5 provides a different schematic view of the FIG. 4 embodiment.

A disadvantage of the streaming architecture FIG. 3 may be that the end-to-end delay from capture to rendering may be too large, which may be caused at least in part by the need to decode and then again encode each video in between the transmitter device and the receiver device, since each en-/de-coding step may introduce a sizable latency. In the co-pending application EP19186699.5 of this applicant, a technique is described which achieves a lower end-to-end delay while still allowing to offload the video processing, in terms of being computationally intensive processing such as HMD removal, from the transmitter devices, which technique is hereby incorporated by reference. FIGS. 4 and 5 briefly describe this technique.

FIG. 4 shows an example in which a plurality of transmitter devices UE1-UE3 each transmit a captured video to a respective edge node EN1-EN3 of the telecommunication network 20 which processes and encodes the video using a tiled video streaming codec to obtain respective tile-based video streams 40-42, and in which a combiner 50 combines the tile-based video streams to obtain a composite video stream 60 which may be transmitted to a receiver device UE4. In this embodiment, so-called edge nodes are used to process the videos. Such edge nodes exist in various network types and architectures, and may generally be located at an edge of the telecommunication network 20 to respective access nodes 10-12 via which the transmitter devices UE1-UE3 are connected to the telecommunication network 20.

For example, such edge nodes are known from the field of edge computing, in which cloud computing resources may be placed close to the edge of the telecommunication network. This placement may have different benefits. For example, it may allow for a low-delay connection between a respective device and the cloud computing resources. Another example is that such placement may offload traffic from the core of the telecommunication network. Using edge computing for video processing is known per se, for example from live TV production scenarios in which the video processing is moved from a TV truck in the parking lot to an edge computing platform. In such examples, raw video footage may be sent to the edge computing platform, where the raw video is processed before being streamed as a TV-ready video stream.

The FIG. 4 example may offload the processing of the video to the telecommunication network, and specifically to the edge nodes EN1-EN3 of the telecommunication network. To send the video from the transmitter device to the edge node, a low latency video transmission technique may be used, as the connection to the edge node typically has low latency and high bandwidth and thus low jitter (referring to the latency variation between packets). This may also avoid a need for large buffering at the edge node, which may otherwise be needed if the jitter were to be high and which may introduce additional delay. Such buffering may also not be needed for the video processing performed by the edge nodes, as such video processing may typically involve video frames being processed as they arrive at the edge node, e.g., there may no need for play-out at the edge that has to be continuous/smooth.

The transmission of the video from the transmitter device to the edge node may therefore achieve lower latency at the expense of higher bandwidth, for example by sending the video in uncompressed form or using lossless compression or lossy compression which only uses spatial dependencies or spatiotemporal compression which only uses forward temporal inter-frame dependencies. Such compression techniques are known per se. In general, the video coding technique and associated video streaming codec may be a low latency or ultra-low latency video coding technique or codec. In contrast, the latency introduced by the tile-based video streaming codec may be (much) higher, for example due to using forward and backward temporal inter-frame dependencies. The difference in latency introduced by the respective video coding techniques may for example be at least 1:2, 1:5 or 1:10 (delay caused by encoding and decoding by transmitter device and edge node, versus encoding and decoding by edge node and receiver device, respectively). Typically, a 'regular' real-time video transmission will have a delay in the order of magnitude of 200 to 300 ms up to 500 ms, where the delay may consist of capture delays depending on the frame rate, of encoding delays due to temporal dependencies in encoding, of transmission and queueing delays in the network, of buffering in the receiver devices, and of decoding and display delays, etc. For low-latency streaming, typically the main differences with 'regular' video streaming will be in encoding, where future dependencies during encoding are avoided at the cost of higher bandwidth, i.e., less compression, and in minimizing the buffering at the receiving end. Buffering cannot be completely avoided in case of play-out at the receiving end, as buffer underruns may interrupt smooth play-out. A low latency or ultra-low latency video stream may thus have an end-to-end delay of about 100 ms or even lower.

FIG. 5 provides a different schematic view of the FIG. 4 embodiment indicating the location of the various functions from capture to render. Namely, each transmitter device UE1-UE3 is shown to perform a capture 100, after which the captured video is sent directly to a respective edge node EN1-EN3. It is noted that such edge nodes may be different edge nodes, e.g., due to the difference in location between the transmitter devices, but may also comprise edge nodes which are the same, e.g., 'shared', between several transmitter devices. The 'direct transmission' may involve the aforementioned lack of compression, or use of a low latency or ultra-low latency video coding technique. As this incurs relatively little delay, the encoding and decoding between a respective transmitter device UE1-UE3 and a respective edge node EN1-EN3 is not shown. Each edge node EN1-EN3 may then process 130 the respective video and encode 140 the processed video using a tile-based video streaming codec, after which the tiled-based video streams may be sent to a combiner system 50 which combines 150 the tiles of the tile-based video streams in the compressed domain to obtain a combined tile-based video stream to be transmitted to the receiver device UE4 which may then decode 160 and render 170 the videos.

The following measures address the following: it may be desired to enable different substreams of a composite video stream to be processed in different ways, for example by processes or subprocesses of different applications, while accounting for that the composition of substreams may dynamically change, for example by one or more substreams changing in resolution and/or shape, substreams being added and/or substreams being removed. To enable such flexibility, metadata may be generated which comprises an identifier of each respective substream. This metadata may be generated by copying (parts of) identifying data already present in the signaling, e.g., in the stream request or the reply thereto, or already present in the incoming video stream metadata, or by re-using existing information such as device names or transport addresses. Typical examples of identification metadata are, e.g., the origin address for a user video in a videoconference, e.g., a SIP address or H.323 address or a E.164 telephone number, or the content URL or content address for media content, e.g., an RTSP URL, an MPD URL, a YouTube URL, a multicast address. This metadata may then be signaled to the receiver device, for example linked to composition metadata describing a low-level composition of the spatial segments. An example of such composition metadata is the so-termed spatial relationship description (SRD) [4].

Conventionally, the composition of substreams in a composite video stream may be statically defined. Such a statically defined composition may be limiting. For example, the composition may explicitly or implicitly define a spatial resolution. If the composition is static, the spatial resolution may also be static. This may not allow for dynamic resolution changes, e.g., for dominant-speaker detection in which the substream of a dominant speaker may be given a higher resolution than the substreams of other participants. Similarly, this may not allow for lowering the spatial resolution of the substream, for example when the substream is displayed in 3D, for example in a virtual reality environment, but at a distance. An example of displaying at a distance is a video avatar for which the substream is displayed far away, or moving away, in the virtual reality environment from a current viewer, and which would allow lowering the spatial resolution if dynamic resolution changes would be supported. Such static compositions may also be limited to use in a single administrative domain since a single decision may need to be reached on which composition to use.

In accordance with the claimed measures, metadata may be generated, and in some cases be added to the composite video stream, which metadata may identify a particular substream, for example in terms of what the source of the substream is (e.g. from which videoconferencing participant) or what type of video it is (e.g. a YouTube video) or what the intended destination of the substream is (e.g., a particular application), etc. Even if the composition changes, this may still allow the receiver device to identify a particular substream and to process the substream accordingly, for example by passing the decoded video data to a process of a particular application.

Figure 6:
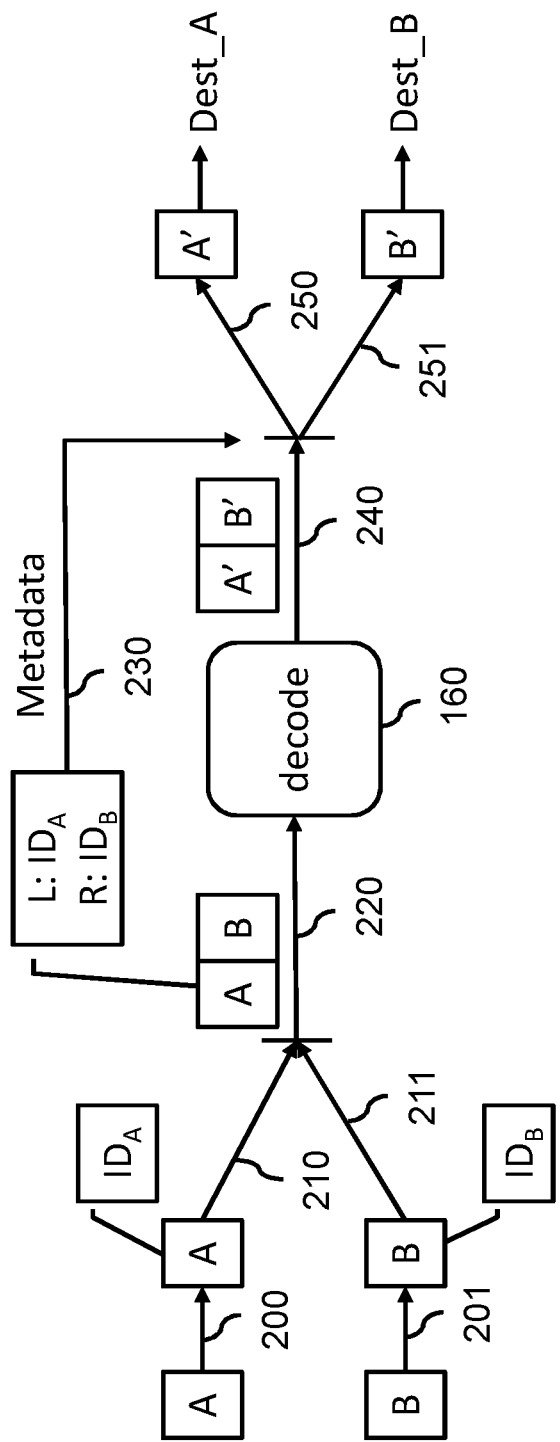
FIG. 6 illustrates a combining of video streams as a side-by-side tiled video stream and the generation of metadata which contains identifiers of the respective video streams, which metadata may be provided to a receiver device which may then split the video streams and pass the decoded video data to a respective destination based on the identifier of the respective video stream obtained from the metadata.

FIG. 6 illustrates a combining of video streams as a side-by-side tiled video stream and the generation of metadata which contains identifiers of the respective video streams, which metadata may be provided to a receiver device which may then split the video streams and pass the decoded video data to a respective destination based on the identifier of the respective video stream obtained from the metadata.

Namely, it is shown that a video stream A 200 and a video stream B 201 may be streamed, for example from respective transmitter devices (not shown in FIG. 6). For each of the video streams A, B, a respective identifier may be obtained, namely $ID_A$ and $ID_B$. Each identifier may take a form as described elsewhere in this specification, and may in this example be included in the respective video streams A, B, resulting in video streams A, B, 210, 211 comprising the respective identifiers. Both video streams A, B may then be combined into a composite video stream. In the example of FIG. 6, both video streams may be composed side-by-side in the composite video stream 220, in that video stream A may be shown at a left side (L) of the composite video stream 220 and video stream B may be shown in the right-hand (R) side of the composite video stream 220. At the entity generating the composite video stream, e.g., the combiner (not shown in FIG. 6), identification metadata may be generated which may identify the respective video streams. The identification metadata may be generated based on the identifiers which were previously received. As shown in FIG. 6, the identification metadata may also be linked to the respective substreams, namely by indicating that the left video stream contains a video identified by $ID_A$ and that the right video stream contains a video identified by $ID_B$. Effectively, the metadata may represent a combination of composition metadata, indicating that the composite video stream is composed of a left and a right substream, and identification metadata, indicating that the left substream corresponds to $ID_A$ and the right substream corresponds to $ID_B$. The metadata 230 may be provided to a receiver device which may also receive and decode 160 the composite video stream 220, thereby resulting in decoded video data 240 containing the decoded video data A' of video stream A and the decoded video data B' of video stream B. The decoded video data A', B' may then be split into respective parts 250, 251 which may be passed to different destinations on the basis of the metadata 230. For example, the different destinations may represent processes of different applications or of different services, or different processes or different subprocesses of a same application or of a same service, or one stream being played locally and one stream being forwarded (e.g., 'casted') to another device, etc.

Figure 7:
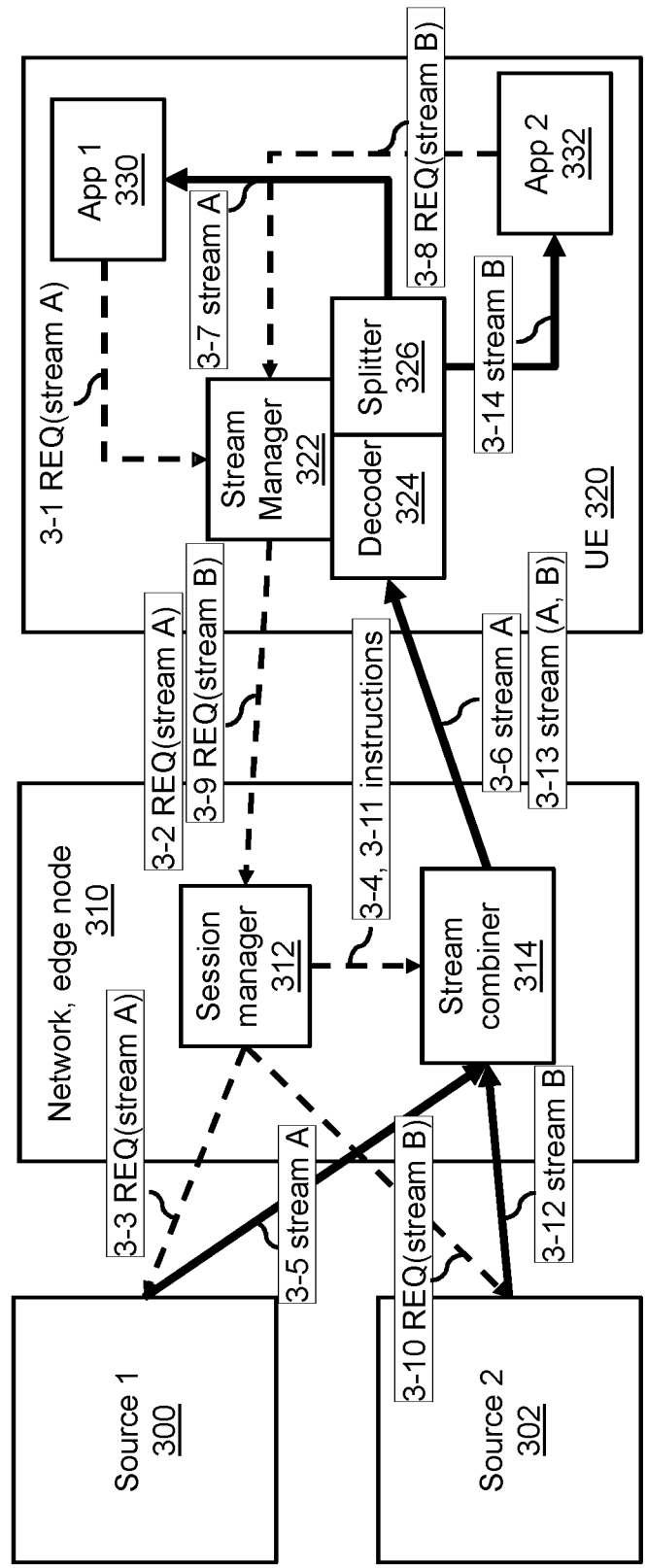
FIG. 7 shows a more detailed example of the FIG. 6 illustration, showing message flows between a receiver device, a combiner and two transmitter devices.

FIG. 7 shows a more detailed example of the FIG. 6 illustration, showing message flows between a receiver device, a combiner system and two transmitter devices. At least part of this process may take place during a streaming session setup.

3-1 Application 1 ('App 1') 330 may request a video stream A, for example by sending the request to a stream manager 322 running on the UE 320.

3-2 The stream manager 322 may forward this request to a network node 310 which may be capable of combining several video streams into a composite video stream, i.e., a combiner system. Even though this is the first video stream to be set up, the stream manager 322 may already indicate that the UE 320 supports tiling to support combining multiple streams into a composite video stream.

3-3 The session manager 312 on the network node 310 may request video stream A from the source 1 300, and . . .

3-4 . . . may instruct the stream combiner 314 to send the incoming video stream to the UE 320, using a tile-based encoding standard.

3-5 Source 1 300 may send video stream A to the network node 310.

3-6 The network node 310 may forward video stream A to the UE 320, using a tile-based encoding standard.

3-7 The decoder 324 may decode video stream A, and the stream manager 322 may arrange for the splitter 326 to forward to the decoded video data of video stream A to the application 1 330.

3-8 Next, application 2 332 may request a video stream B.

3-9 The stream manager 322 may forward this request to the same network node 310.

3-10 The session manager 312 on the network node 310 may request video stream B from the source 2 302, and . . .

3-11 . . . may instruct the stream combiner 314 to combine the incoming stream B with the incoming stream A, using the tile-based encoding standard.

3-12 Source 2 302 may send video stream B to the network node 310.

3-13 The stream combiner 314 may now combine video streams A and B into a single composite video stream A, B, and sends this to the UE 320.

3-14 The stream manager 322 may now arrange for the splitter 326 to split the decoded video data into two separate parts, and may thus send the decoded video data of video stream B to application 2 332.

The stream manager 322 of FIG. 7 may thus be part of a system for managing composite streams. Each application may be entirely unaware of the combined streaming, but may consider the stream manager 322 as a proxy for requesting streams, knowing the stream manager 322 may deliver the stream already decoded. The stream manager 322 or similar functionality for managing composite streams may for example be part of the operating system (OS), similar to for example a network stack offered by the operating system for use by different applications.

Figure 8:
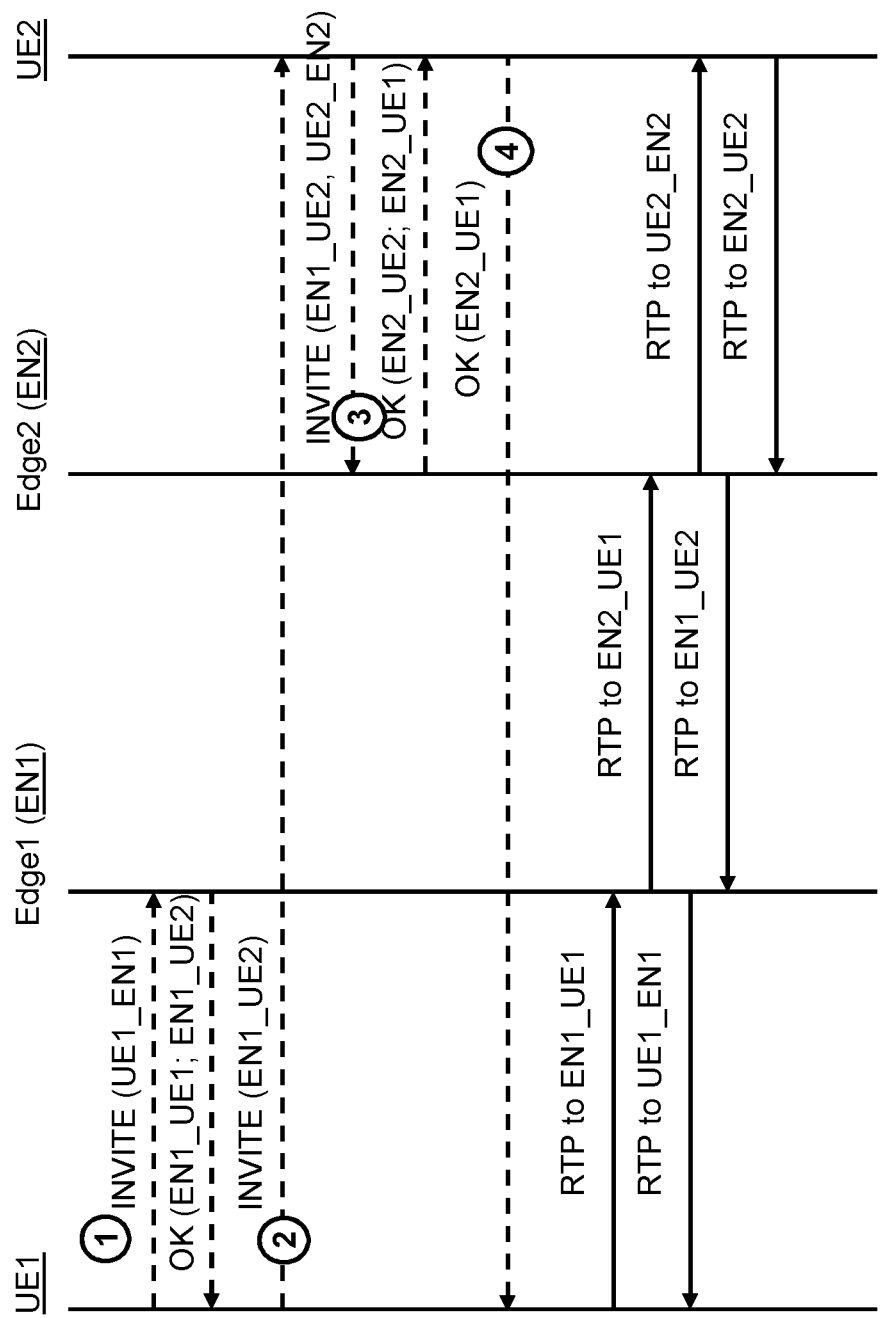
FIG. 8 shows a message exchange in which a receiver device may insert an edge node in the streaming path from transmitter device to receiver device.
Figure 9:
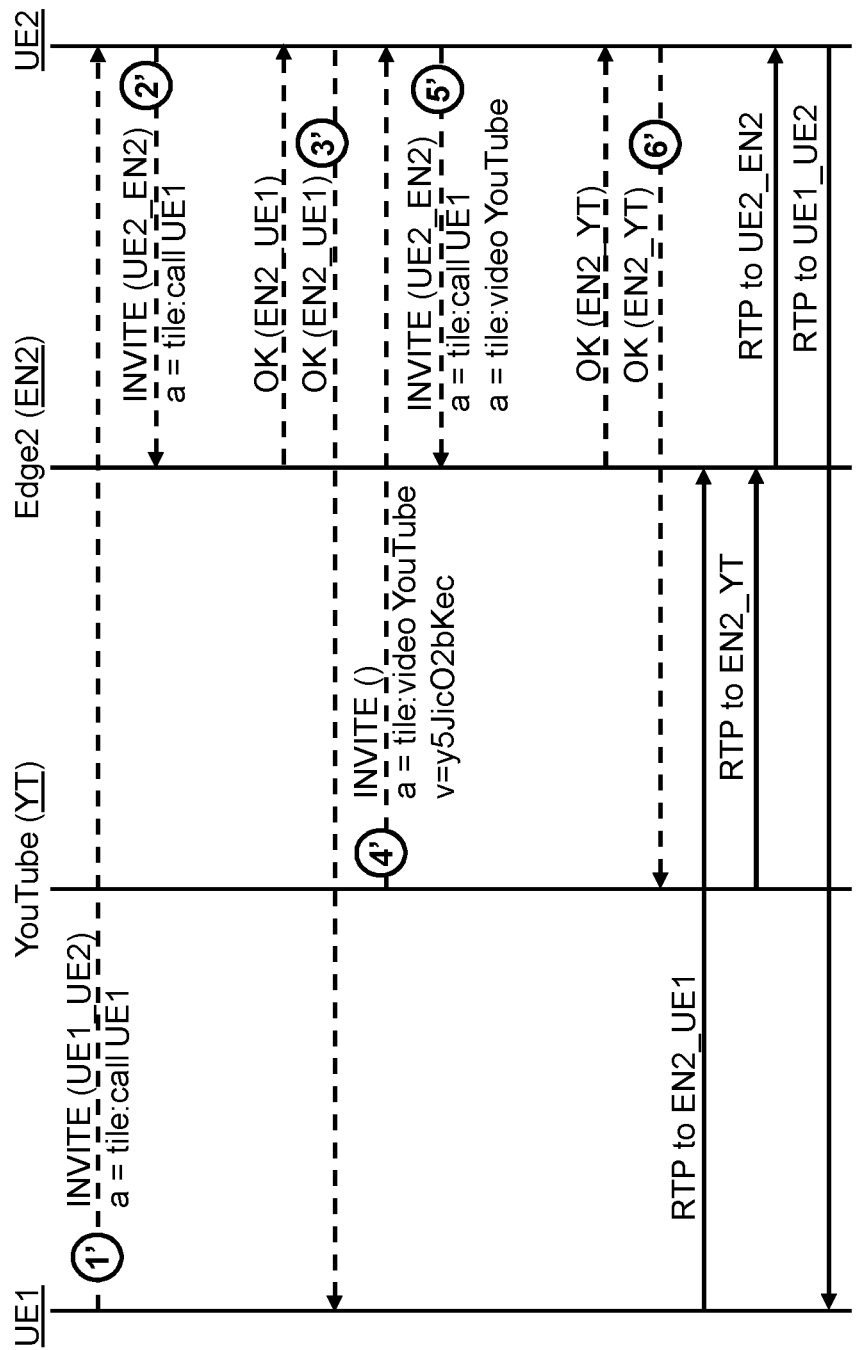
FIG. 9 shows a further message exchange in which a receiver device may request an edge node to combine video streams into a combined stream.

FIGS. 8 and 9 relate to the following. A single entity, e.g., such as an application server such as a video conferencing server, may control entities such as transmitter devices, receiver devices and combiner systems, with the latter being in the following embodied by edge nodes, to control the streaming routing logic, referring to logic defining which streams are to be transmitted to where. This routing logic may also be de-centralized, e.g., having each client device transmit video streams to other client devices, and each client device 'inserting its edge' in the streams path, both in the outgoing and on the ingoing direction. Here, the term 'inserting its edge' may refer to a client device causing one or more edge nodes, which may be located at an edge of a telecommunication network with the access network via which the client device is connected to the telecommunication network, to become inserted into the stream path of an outgoing or ingoing video stream. Here, 'inserted into the stream path' may refer to a respective video stream being transmitted or received via the edge node(s). The edge node(s) may then be used to generate a composition of several video streams so as to generate a composite video stream as described elsewhere. The edge node(s) may, when generating the composite video stream, also generate the metadata as described elsewhere, e.g., the composition metadata and the identification metadata.

FIG. 8 shows a message exchange involving such decentralized routing. Here, SIP INVITE messages and their OK responses are shown, while ACKs are not shown for ease of illustration. Further shown between parentheses are the transport addresses specified for the video streams, shown as: stream_to_entity [underscore] stream_from_entity, i.e. UE1_EN1 denotes the address for the stream to UE1 from EN1. This signaling flow is based on IETF RFC 4117, which is a standard on including transcoders, i.e. media processing entities, in a streams path.

In this example, UE1 may wish to send a video stream to UE2, while wishing this video stream to be processed by edge node 1 (Edge1, in the following EN1), for example to perform the computer vision-based processing such as HMD removal. UE2 may wish to receive this video stream, but may wish to have edge node 2 (Edge 2, in the following EN2) process the video stream before delivering it to UE2, for example by combining multiple incoming (tiled) streams into a single decodable composite video stream. The return stream from UE2 to UE1 is going through EN2 and EN1 for the same reasons. With message (1), UE1 may contact EN1 to signal EN1 where to send the return stream, and to receive the transport addresses via which EN1 wishes to receive video streams. In particular, EN1 may return both the transport addresses for the video stream outgoing from UE1 and for the video stream incoming to UE1. Note that the latter transport address is shown to be encoded as EN1_UE2, even while EN1 may not know that it is UE2 that will send this incoming stream; this encoding in FIG. 8 is simply for readability of the figure, as the address is just an address. With message (2), UE1 may invite UE2, using the transport address of EN1 to be used for the stream from UE2 to UE1. In response, with message (3), UE2 may invite EN2, signaling both the EN1_UE2 address EN2 has to use to send the outgoing stream to UE1 (which thus goes to EN1) and the UE2_EN2 address which indicates where UE2 wishes to receive the incoming stream. In response, UE2 may receive the transport addresses to use from EN2. Eventually, with message (4), UE2 may respond to the INVITE from UE1, signaling the transport address of EN2, where the stream to UE2 should be send to.

It will be appreciated that such and similar types of signaling flows may allow both sending entities and receiving entities to include an edge (node or system of edge nodes) in the streams flow for processing or combining of video streams.

Furthermore, by including the identification metadata, for example as a description of a contents, source or destination of a stream, in a Session Description Protocol (SDP) description or in the composite video stream's or its substreams' header, various substreams may be combined, e.g., by EN2 in the example of FIG. 8, in a composite stream while still allowing the receiver device, e.g., UE2 in the example of FIG. 8, to distinguish the substreams from each other. The component of such a receiver device may be called a called a stream de-multiplexer, and may be performed by a process or subprocess, e.g., of an application or service, 'consuming' both streams or may be a separate function, which may then forward the decoded video data of a respective video stream to the select process or subprocess.

For example, this may allow combining an incoming video call with the streaming of an online video. A receiver device may then render both videos in their respective windows. Another example is that this may allow combining multiple incoming video call streams from a group teleconference into a single composite video stream, while still allowing a receiver device to place each participant in a specific place, e.g. to be used in large multi-display conference setups or in VR conferences.

The composition metadata may for example define multiple new signaling attributes, which may for example be defined in the SDP:

In the SDP, an attribute may indicate that a stream is requested to be delivered in a tiled format, for example to enable the stream to be directly insertable into a composite stream, which may be combined with an indicated resolution (e.g., using RFC 6236). For example, a new Media Type may be defined, e.g., called H265_tile, which may then be used in the rtpmap attribute under 'encoding name':

a=rtpmap:<payload type> <encoding name>/<clock rate> [/<encoding parameters>]

In the SDP, an attribute may indicate what a stream is, e.g., from which source or application or what the content is. This attribute may represent the identification metadata as described elsewhere. On the session level, SIP may describe the originator of a stream with a username. However, on the media level, no such attribute exists yet and may thus be defined as described below. Such a description may be given for each individual tile. Tiles are normally defined in a left-to-right top-to-bottom manner, or may be defined by giving their top-left coordinates as they are in the SRD [4]. The attribute may thus be a media-level attribute that may be added multiple times in an order which corresponds to the order of the tiles:

a=tile:<type> <source>[/<source parameters>] [/<coordinates>] with for example the following definitions:

<type> may be a content type, e.g., 'call', 'video', 'security'

<source> may be an application-defined part. This may for example contain the source address of a participant, or define the source platform, e.g., 'YouTube', and optionally contain the video identifier (e.g. v=y5JicO2bKec)

<coordinates> may be optional, and may for example have the format [x-coordinate]×[y-coordinate]

FIG. 9 shows a message exchange involving decentralized routing, in which use may be made of the SDP as indicated above. Here, steps (1'), (2') and (3') may be similar to those of FIG. 8. However, a difference may be that the video stream from UE2 to UE1 is not tiled but rather a normal non-tiled video stream and may thus not have to pass through EN2. In step (4'), the video connection for the YouTube video may be setup. In this case, YouTube (YT) may already adhere to the tiled format; this may be one of the formats offered by YouTube (for supporting this invention), so that the receiver UE2 may select this format and signal the selected format in step (6'). Step (5') may concern the following: UE1 and YT may not be aware of each other, while UE2 may desire to receive two media streams as a composite video stream. In step (5'), UE2 may signal this desire to EN2 with a re-INVITE to the existing session while adding a media element. This may mean that on the signaling level, there may be a session between YT and UE2 and another session between UE1 and UE2, while on the media level, the media between YT and UE2 may be combined with the call session as previously described with reference to FIG. 8. Effective, in step (5'), instead of setting up a new media session with EN2, UE2 may send a re-INVITE for the existing media session to request the insertion of the additional tile. Note that in this example, both tiles may be described in the SDP, namely as part of the same media description. Accordingly, the order in which the tiles are requested may represent the order in which EN2 inserts them into the composite video stream. Alternatively, if EN2 inserts the tiles in a different order, EN2 may signal the receiver device the different order, for example in the OK response, e.g., using the <coordinates> as described above. Note that the above-described message exchange may occur at a streaming session setup, but may also represent a modification of an existing session. For example, in the example of FIG. 9, there may initially be a video stream streaming from UE1 to UE2. Once UE2 starts YouTube streaming, a re-INVITE message with a call hand-over may be sent to UE1 to transfer the incoming video stream from UE1 to EN2, including in this request the request to switch to a tiled streaming format. Similar to FIG. 8, this re-INVITE may start with an INVITE from UE2 to EN2 to indicate the UE2_EN2 address and to receive the EN2_UE1 address in the OK from EN2 to UE2, and only thereafter sending the re-INVITE to UE1 signaling the EN2_UE1 address. After the switch, the YouTube video may be requested in the same way as shown for the example of FIG. 9.

In general, the techniques described in this specification are not limited to video-based communication use cases, such as video-based VR, but may be applied to any use case in which several video streams may be streamed to a receiver device.

As tile-based streaming codec, any known and future tile-based video streaming codec may be used, such as in HEVC and VP9, including but not limited to a codec based on the tiling mechanisms being developed in H.266/VVC, which are expected to contain advanced multi-configuration tiles, in that certain tiles may be streamed at higher framerates than others, or at other decoder settings, or in different shapes, allowing low latency and high-quality tiles to be combined in single VVC frames. Such techniques may be used to further reduce the delay of self-views if a self-view is encoded as a tile to be combined with other tiles.

The techniques described in this specification may be used to generate multiple different combined tile-based streams, e.g., two combined streams each containing the videos of four transmitter devices, using different combiners or a same combiner. These multiple different combined tile-based streams may be sent to different receiver devices, but also to a same receiver device, for example if the decoding limitations of the receiver device do not require a single video stream but rather impose limits in the spatial resolution or bitrate of each individual video stream and which may otherwise be exceeded by a single combined tile-based video stream.

Multiple transmitter devices may be connected to the same edge node. In this case, the edge node may immediately combine the respective videos in a tile-based video stream which may then later be combined with other tile-based video streams, e.g., further along the transmission chain by a further combiner or edge node.

A combiner may, when combining streams, also transform (e.g., transcode, transmux, re-packetize, re-encapsulate etc.) one or more of the video streams into a different streaming format. If one of the streams is meant for communication, then it may be preferred to keep latency low, for example by using RTP. Alternatively, for example if none of the video streams are meant for communication, an adaptive streaming technique may be used, such as MPEG DASH. In general, the combiner may transform an RTP stream to a DASH based stream, and stream the resulting combined stream using DASH. The combiner may also transform a DASH based stream to an RTP stream, and stream the resulting combined stream using RTP.

In general, each of the identification metadata and the composition metadata, for example as a combination of content/source identifier and tile identifier, may be inserted into the stream headers itself, instead of exchanged in the SDP. Each type of metadata may also be signaled in a separate metadata stream, for example as defined in MPEG MORE. Instead of the combiner being embodied by a network node, the combiner may be part of a receiver device, e.g., running as a separate process or service from a streaming client process or service, e.g., a DASH client process or service. In such examples, the network interface subsystem may comprise an internal communication interface, such as an API-based communication interface or an internal bus, for internally communicating with the streaming client process or service.

In general, the stream manager (e.g., as discussed with reference to FIG. 7) and the decoder/splitter may be part of an Operating System (OS), instead of being part of an application. This way of streaming may be more similar to the networking stack, where the handling of incoming packets is done in the OS, and the result may be sent to a select process (e.g., application), e.g., using a destination identifier as described elsewhere (e.g. the port number, resulting in a socket to which the application may be connected). In general, there may be different scenario's how to include an edge as a combiner in the end-to-end delivery pipeline. For example, an edge may be included as a proxy, which may request/setup streams on behalf of the client, as shown in FIG. 7. Another example is that the UE may dynamically insert the combiner in the delivery pipeline, as shown in FIGS. 8 and 9. Yet another example is to have the combiner intervene in the streaming, e.g., by being either involved in the signaling (e.g. as a transparent proxy) or by using packet inspection. If the combiner detects that multiple video streams are being streamed to an UE, it may intervene, either by adjusting the signaling or by explicitly sending instructions to the UE that cause the UE to request the combiner to combine streams using signaling such as shown in for example FIG. 9.

Figure 10:
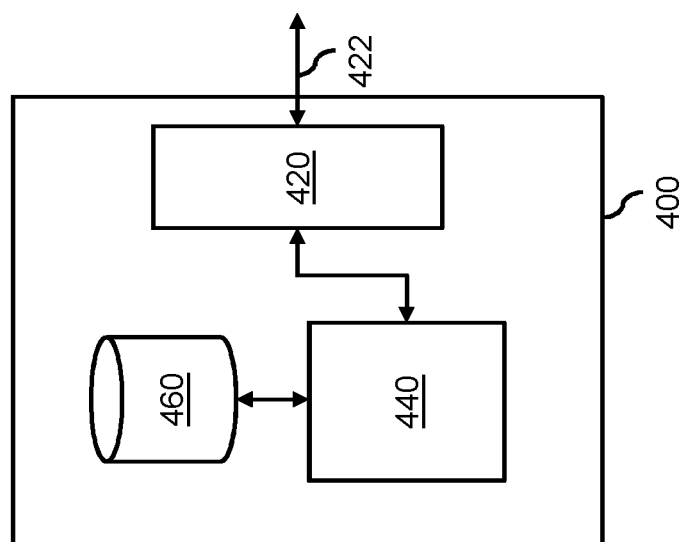
FIG. 10 shows a processor system embodying, e.g., a combiner system.

FIG. 10 shows a processor system 400 embodying entities as described elsewhere in this specification, such as a combiner (system), an edge node, a network node, a transmitter device, a receiver device or in general an UE. The processor system 400 is shown to comprise a network interface 420 for sending and receiving data via network data communication 422. The network interface 420 may be any suitable type of network interface, such a wireless network interface, e.g., based on Wi-Fi, Bluetooth, ZigBee, 4G or 5G mobile communication, or a wired network interface, e.g., based on Ethernet or optical fiber. For example, the network interface 420 may be a local area network (LAN) network interface or an interface to wide area network (WAN) such as the Internet. In particular, if the processor system 400 embodies a UE, the network interface 420 may be a network interface to an access network and may be a type of network interface which corresponds to the particular type of access network.

The network interface 420 may represent an example of a network interface subsystem as described elsewhere. In other examples, the network interface subsystem may comprise two or more of such network interfaces 420. For example, in case the processor subsystem 400 is a combiner system, e.g., in the form of an edge node, the processor subsystem 400 may comprise a first network interface for receiving the video streams from upstream of the combiner system and a second network interface for transmitting the composite video stream downstream to the receiver device. Each network interface may be of a type as described for the network interface 420, and may in general be a same type or different types of network interfaces.

The processor system 400 is further shown to comprise a processor subsystem 440 which may be configured, e.g., by hardware design or software, to perform operations described elsewhere in this specification in as far as relating to the described functions of the respective entities (combiner (system), edge node, network node, transmitter device, receiver device, UE). For example, the processor subsystem 440 may be embodied by a single Central Processing Unit (CPU), but also by a combination or system of such CPUs and/or other types of processing units, such as for example Graphics Processing Units (GPUs), hardware encoders and hardware decoders. The processor system 400 is further shown to comprise a data storage 460, such as internal memory, a hard disk, a solid-state drive, or an array thereof, which may be used to store or buffer data such as received parts of video stream (s) and/or decoded or processed video data parts.

The processor system 400 may be embodied by a (single) device or apparatus. For example, the processor system 400 may, when representing a transmitter device or receiver device or another type of UE, be a smartphone, personal computer, laptop, tablet device, gaming console, set-top box, television, monitor, projector, smart watch, smart glasses, media player, media recorder, head mounted display device, etc. The processor system 400 as receiver device may also be embodied by a non-UE type of receiver device, such as a network node or a system of network nodes representing for example a networked video recorder or a network video analyzer. The processor system 400 may also be embodied by a distributed system of such devices or apparatuses. In other examples, for example in those in which the processor system 400 represents a combiner (system), an edge node or a network node, the processor system 400 may be embodied by a server or by a distributed system of servers, or in general by one or more network elements.

In general, the processor system 400 of FIG. 10 may be embodied as, or in, a device or apparatus. The device or apparatus may comprise one or more (micro)processors which may represent the processor subsystem 440 of the processor system 400 and which may execute appropriate software. Software implementing the functionality of the processor subsystem 440 may have been downloaded and/or stored in a corresponding memory or memories, e.g., in volatile memory such as RAM or in non-volatile memory such as Flash. Alternatively, the processor subsystem 440 may be implemented in the device or apparatus in the form of programmable logic, e.g., as a Field-Programmable Gate Array (FPGA). In general, each unit of the processor system 400 may be implemented in the form of a hardware circuit. If the processor system 400 is a distributed system, the processor subsystem 440 may also be a distributed subsystem such as a distributed subsystem of (micro)processors.

Figure 11:
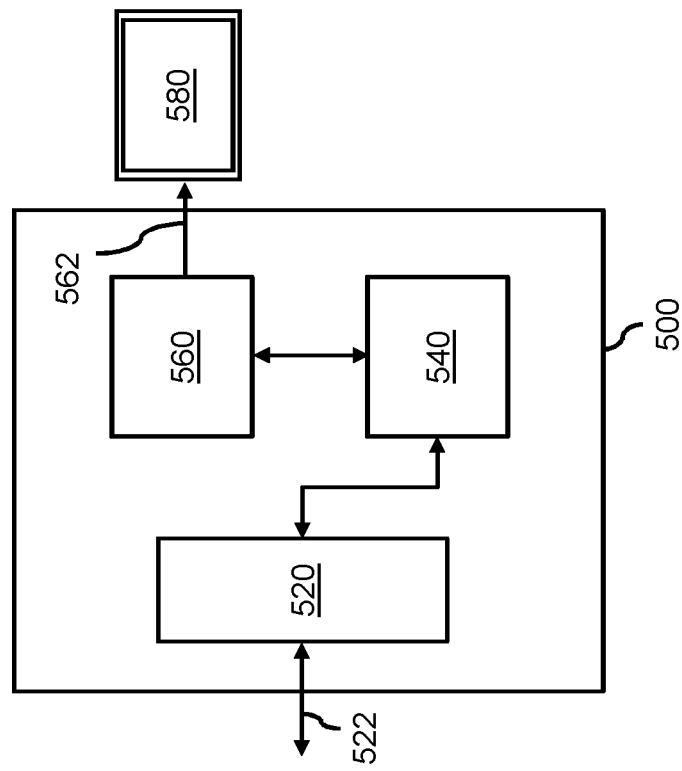
FIG. 11 shows a processor system embodying, e.g., a receiver device.

FIG. 11 shows a processor system 500 embodying a receiver device, which may also be a combined receiver-transmitter device. As in the case of the processor system 400 of FIG. 10, the processor system 500 of FIG. 11 is shown to comprise a network interface 520 for network data communication 522, which may be a same type of network interface as described with reference to FIG. 10 for the network interface 420. Moreover, as in the case of the processor system 400 of FIG. 10, the processor system 500 of FIG. 11 is shown to comprise a processor subsystem 540, which may be a same type of processor subsystem as described with reference to FIG. 10 for the processor subsystem 440. However, in the example of FIG. 11, the processor system 500 is further shown to comprise a display output 560 for outputting display data 562 to a display 580, such as an HMD. Although FIG. 11 shows the display 580 to be an external display, in some embodiments, the processor system 500 may comprise or may be integrated into the display 580. Using the display output 560, the processor system 500 may display video, such as any received combined tile-based video stream. To generate the display data 562, the processor subsystem 540 may comprise one or more CPUs and one or more GPUs. For example, the GPU(s) may perform the actual rendering and the CPU(s) the higher-level orchestration of the rendering.

Figure 12:
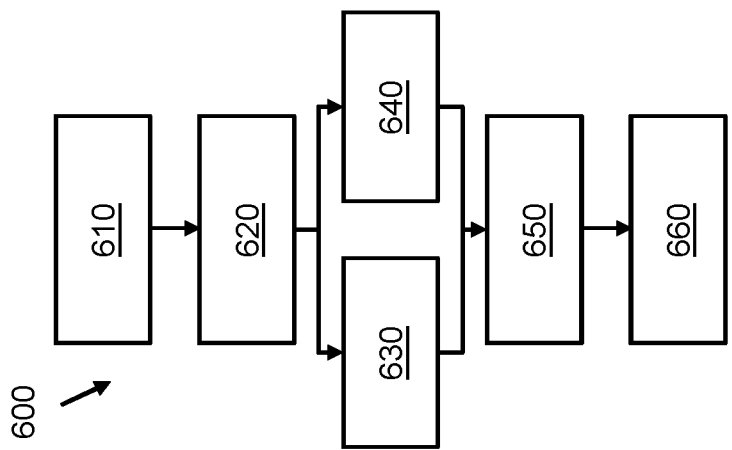
FIG. 12 shows a method for combining video streams.

FIG. 12 shows a computer-implemented method 600 for combining a plurality of video streams into a composite video stream. The method 600 is shown to comprise a step of receiving 610 at least a first video stream comprising a first video of a first media source and a second video stream comprising a second video of a second media source. The method 600 is further shown to comprise a step of, in a compressed domain, combining 620 the first video stream and the second video stream to obtain a composite video stream, wherein the composite video stream is a spatially segmented composite video stream, and wherein said combining comprises including each respective video stream as one or more independently decodable spatial segments in the spatially segmented composite video stream. The method 600 is further shown to comprise a step of generating 630 composition metadata describing a composition of the spatial segments in the composite video stream. The method 600 is further shown to comprise a step of generating 640 identification metadata comprising a first identifier of the first video stream and a second identifier of the second video stream, wherein the first identifier and the second identifier uniquely identify the respective video streams in the composite video stream. The method 600 is further shown to comprise a step of streaming 650 the composite video stream to a receiver device and providing 660 the composition metadata and the identification metadata to the receiver device.

Figure 13:
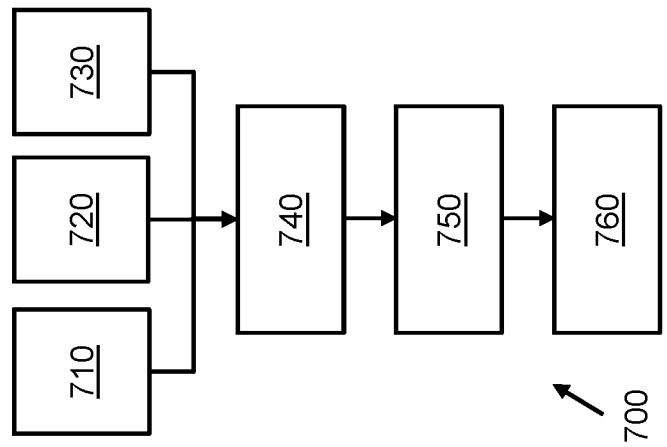
FIG. 13 shows a method for receiving and processing videos.

FIG. 13 shows a computer-implemented method 700 for receiving and processing a first video of a first media source and a second video of a second media source. The method 700 is shown to comprise a step of receiving 710 a composite video stream as described elsewhere in this specification. The method 700 is further shown to comprise a step of receiving 720 composition metadata describing a composition of the spatial segments in the composite video stream. The method 700 is further shown to comprise a step of receiving 730 identification metadata comprising a first identifier of the first video stream and a second identifier of the second video stream, wherein the first identifier and the second identifier uniquely identify the respective video streams in the composite video stream. The method 700 is further shown to comprise, for at least one of the spatial segments of the composite video stream, a step of obtaining 740 decoded video data of a respective video stream based on the composition metadata and a decoding of the composite video stream, a step of identifying 750 a process for handling the decoded video data based on a respective identifier of the respective video stream, and a step of providing 760 the decoded video data of the respective video stream to the process. Steps 740-760 may be performed for each of the spatial segments but also for one or a subset of the spatial segments, except that the composite video stream may be decoded once to obtain the decoded video data of all spatial segments and not for each individual segment again.

It will be appreciated that, in general, the steps of the computer-implemented method 600 of FIG. 12 and/or the steps of the computer-implemented method 700 of FIG. 13 may be performed in any suitable order, e.g., consecutively, simultaneously, or a combination thereof, subject to, where applicable, a particular order being necessitated, e.g., by input/output relations. For example, steps 630 and 640 may be performed simultaneously or overlapping in time. Another example is that steps 710, 720 and 730 may be performed simultaneously or overlapping in time.

Figure 14:
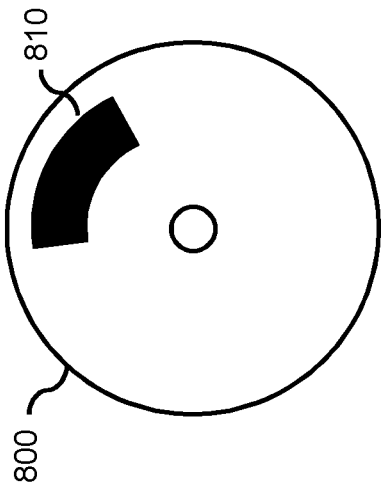
FIG. 14 shows a computer-readable medium comprising non-transitory data.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 800 as for example shown in FIG. 14, e.g., in the form of a series 810 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 14 shows by way of example an optical storage device 800.

In an alternative embodiment of the computer readable medium 800 of FIG. 14, the computer readable medium 800 may comprise transitory or non-transitory data 810 representing identification metadata as described in this specification.

Figure 15:
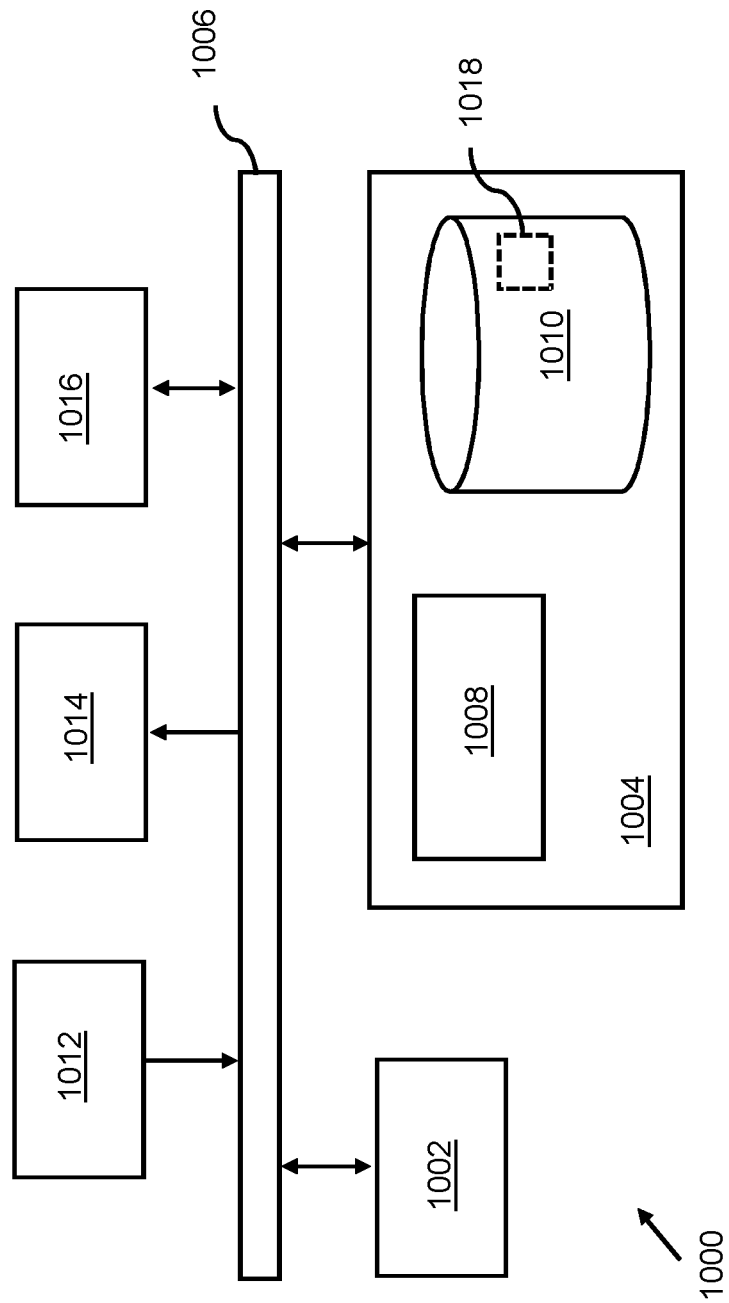
FIG. 15 shows an exemplary data processing system.

FIG. 15 is a block diagram illustrating an exemplary data processing system 1000 that may be used in the embodiments described in this specification. Such data processing systems include data processing entities described in this specification, including but not limited to any transmitter device, edge node, combiner, combiner system, receiver device, client device, user equipment (UE), etc.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 15, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a transmitter device or receiver device. In that case, application 1018 may represent an application that, when executed, configures data processing system 1000 to perform the functions described with reference to either of said devices. In another example, data processing system 1000 may represent an edge node. In that case, application 1018 may represent an application that, when executed, configures data processing system 1000 to perform the functions described with reference to an edge node. In another example, data processing system 1000 may represent a combiner. In that case, application 1018 may represent an application that, when executed, configures data processing system 1000 to perform the functions described with reference to a combiner.

In accordance with an abstract of the present specification, a combiner system may be provided for combining, in a compressed domain, video streams of different media sources in a composite video stream by including a respective video stream as an independently decodable spatial segment in the composite video stream. The combiner system may generate composition metadata describing a composition of the spatial segments in the composite video stream and identification metadata comprising identifiers of the respective video streams. A receiver system may obtain decoded video data of a respective video stream based on the composition metadata and a decoding of the composite video stream, and based on the identification metadata, identify a process for handling the decoded video data. Thereby, the composition of spatial segments may dynamically change, while still allowing the receiver device to correctly handle the spatial segments.

In the claims, any reference signs placed between parentheses shall not be construed as limiting the claim. Use of the verb "comprise" and its conjugations does not exclude the presence of elements or steps other than those stated in a claim. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A combiner system for combining a plurality of video streams into a tiled video stream, comprising:
 a network interface subsystem configured to:
  receive at least a first video stream comprising a first video of a first media source and a second video stream comprising a second video of a second media source;
  receive at least one of a first identifier of the first video stream and a second identifier of the second video stream from a receiver device as part of a stream request of the receiver device;
 a processor subsystem configured to:
  in a compressed domain, combining the first video stream and the second video stream to obtain a tiled video stream, wherein the tiled video stream is a spatially segmented composite video stream, and wherein said combining comprises including each respective video stream as one or more independently decodable tiles in the tiled video stream;
  generating composition metadata describing a composition of the tiles in the tiled video stream;
  generating identification metadata comprising a first identifier of the first video stream and a second identifier of the second video stream, wherein the first identifier and the second identifier uniquely identify the respective video streams in the tiled video stream;
  via the network interface subsystem, streaming the tiled video stream to the receiver device and providing the composition metadata and the identification metadata to the receiver device, wherein the receiver device identifies a first process respectively a second process for handling the decoded video data of the respective video stream based on the respective identifier of the respective video stream and wherein the first process is a process of a first application and the second process is a process of a second application.

2. The combiner system according to claim 1, wherein the processor subsystem is configured to link the identification metadata to the composition metadata so as to link the first identifier and the second identifier to the respective tiles in the tiled video stream.

3. The combiner system according to claim 1, wherein the processor subsystem is configured to include the identification metadata in the composition metadata and/or in the tiled video stream.

4. The combiner system according to claim 1, wherein the processor subsystem is configured to include the composition metadata and/or the identification metadata as or in at least one of:
- as attributes exchanged in signaling during session management;
- as metadata exchanged with the receiver device via a data channel;
- in a metadata stream; and/or
- in a header of the tiled video stream.

5. The combiner system according to claim 1, wherein the first identifier and/or the second identifier comprise at least one of:
- an identifier of a source of a respective video stream;
- an identifier of a destination of a respective video stream;
- an identifier of a content of a respective video stream; and
- an identifier of an application which has generated or which is intended to handle the respective video stream.

6. The combiner system according to claim 1, wherein the processor subsystem is configured to, via the network interface subsystem, receive at least one of the first identifier and the second identifier from a transmitter device which is streaming the respective video stream to the combiner system;
the receiver device as part of a stream request of the receiver device.

7. The combiner system according to claim 1, wherein the processor subsystem is configured to, via the network interface subsystem, request at least one of the first video stream and the second video stream from a transmitter device based on a stream request of the receiver device for the respective video stream.

8. The combiner system according to claim 7, wherein the stream request is received from at least one of:
- a session management system which receives the stream request from the receiver device and forwards the stream request to the combiner system; and
- the receiver device.

9. The combiner system according to claim 1, wherein the combiner system is embodied by an edge node or a system of edge nodes of a telecommunication network.

10. A receiver device for receiving and processing a first video of a first media source and a second video of a second media source, comprising:
a network interface for receiving:
a tiled video stream, wherein the tiled video stream is a spatially segmented composite video stream which includes at least a first video stream and a second video stream, wherein each video stream is included in the tiled video stream as one or more independently decodable tiles, wherein the first video stream comprises the first video of the first media source and the second video stream comprises the second video of the second media source;
composition metadata describing a composition of the tiles in the tiled video stream; and
identification metadata comprising a first identifier of the first video stream and a second identifier of the second video stream, wherein the first identifier and the second identifier uniquely identify the respective video streams in the tiled video stream;
a processor subsystem configured to, for at least one of the tiles of the tiled video stream:
obtaining decoded video data of a respective video stream based on the composition metadata and a decoding of the tiled video stream;
identify a first process respectively a second process for handling the decoded video data of the respective video stream based on a respective identifier of the respective video stream, wherein the first process is a process of a first application and the second process is a process of a second application, wherein the respective application is running on or is executable by the receiver device;
provide the decoded video data of the respective video stream to the respective process.

11. A computer-implemented method for combining a plurality of video streams into a tiled video stream, comprising:
receiving at least a first video stream comprising a first video of a first media source and a second video stream comprising a second video of a second media source;
receiving at least one of a first identifier of the first video stream and a second identifier of the second video stream from a receiver device as part of a stream request of the receiver device;
in a compressed domain, combining the first video stream and the second video stream to obtain a tiled video stream, wherein the tiled video stream is a spatially segmented composite video stream, and wherein said combining comprises including each respective video stream as one or more independently decodable tiles in the tiled video stream;
generating composition metadata describing a composition of the tiles in the tiled video stream;
generating identification metadata comprising a first identifier of the first video stream and a second identifier of the second video stream, wherein the first identifier and the second identifier uniquely identify the respective video streams in the tiled video stream;
streaming the tiled video stream to a receiver device and providing the composition metadata and the identification metadata to the receiver device, wherein the receiver device identifies a first process respectively a second process for handling the decoded video data of the respective video stream based on the respective identifier of the respective video stream and wherein the first process is a process of a first application and the second process is a process of a second application.

12. A computer-implemented method for receiving and processing a first video of a first media source and a second video of a second media source, comprising:
receiving a tiled video stream, wherein the tiled video stream is a spatially segmented composite video stream which includes at least a first video stream and a second video stream, wherein each video stream is included in the tiled video stream as one or more independently decodable tiles, wherein the first video stream comprises the first video of the first media source and the second video stream comprises the second video of the second media source;
receiving composition metadata describing a composition of the tiles in the tiled video stream;
receiving identification metadata comprising a first identifier of the first video stream and a second identifier of the second video stream, wherein the first identifier and the second identifier uniquely identify the respective video streams in the tiled video stream;
for at least one of the tiles of the tiled video stream:
obtaining decoded video data of a respective video stream based on the composition metadata and a decoding of the tiled video stream;

identifying a first process respectively a second process for handling the decoded video data of the respective video stream based on a respective identifier of the respective video stream, wherein the first process is a process of a first application and the second process is a process of a second application, wherein the respective application is running on or is executable by the receiver device;

providing the decoded video data of the respective video stream to the respective process.

13. A computer-readable medium comprising non-transitory data representing a computer program, the computer program comprising instructions for causing a processor system to perform the method according to claim 11.

14. A computer-readable medium comprising non-transitory data representing a computer program, the computer program comprising instructions for causing a processor system to perform the method according to claim 12.

* * * * *